(12) United States Patent
Bucher et al.

(10) Patent No.: US 7,703,174 B1
(45) Date of Patent: *Apr. 27, 2010

(54) SNAP ON WHEELS

(75) Inventors: John C. Bucher, Hillsboro Beach, FL (US); Chad J. Ricker, North Lauderdale, FL (US)

(73) Assignee: Chien Luen Industries, Co., Ltd., Inc., Orlando Park, FL (US)

( * ) Notice: Subject to any disclaimer, the term of this patent is extended or adjusted under 35 U.S.C. 154(b) by 245 days.

This patent is subject to a terminal disclaimer.

(21) Appl. No.: 11/975,718

(22) Filed: Oct. 19, 2007

Related U.S. Application Data

(62) Division of application No. 11/225,426, filed on Sep. 13, 2005, now Pat. No. 7,614,114.

(51) Int. Cl.
*B30B 33/00* (2006.01)
*B30B 33/06* (2006.01)

(52) U.S. Cl. .............................. 16/30; 190/18 A; 16/29; 16/32; 16/33

(58) Field of Classification Search ...................... 16/29, 16/30, 32, 33, 31 R, 45, 47; 190/18 A
See application file for complete search history.

(56) References Cited

U.S. PATENT DOCUMENTS

| | | | | |
|---|---|---|---|---|
| 3,879,798 A | * | 4/1975 | Krulwich .................... | 16/18 R |
| 3,935,613 A | * | 2/1976 | Kaneko ......................... | 16/30 |
| 4,332,052 A | * | 6/1982 | Remington .................... | 16/30 |
| 4,422,212 A | * | 12/1983 | Sheiman et al. ................ | 16/29 |
| 4,749,159 A | * | 6/1988 | Hoff ........................... | 248/214 |
| 4,817,237 A | * | 4/1989 | Murphy ......................... | 16/29 |
| 4,870,253 A | | 9/1989 | De'Longhi ................... | 219/369 |
| 5,139,116 A | * | 8/1992 | Screen ....................... | 188/1.12 |
| 5,568,671 A | * | 10/1996 | Harris et al. ................. | 16/18 R |
| 5,934,639 A | * | 8/1999 | Chiang et al. .......... | 248/346.11 |
| 6,408,482 B1 | * | 6/2002 | Henriott et al. ................ | 16/29 |
| 6,595,200 B1 | | 7/2003 | Dai ........................ | 126/110 B |

* cited by examiner

*Primary Examiner*—Victor Batson
*Assistant Examiner*—David Reese
(74) *Attorney, Agent, or Firm*—Brian S. Steinberger; Law Offices of Brian S. Steinberger, P.A.

(57) ABSTRACT

Snappable wheel holders for environmental control units such as radiators, heaters, fans and air conditioners. Wheel holders can attach wheels to brackets located underneath the units by mateably attaching male protruding ends into female slots. Plastic triangular pieces can snap into openings to lock the wheel holders to the brackets. The brackets can be attached underneath the units by clamping U-bars with wing nuts.

12 Claims, 30 Drawing Sheets

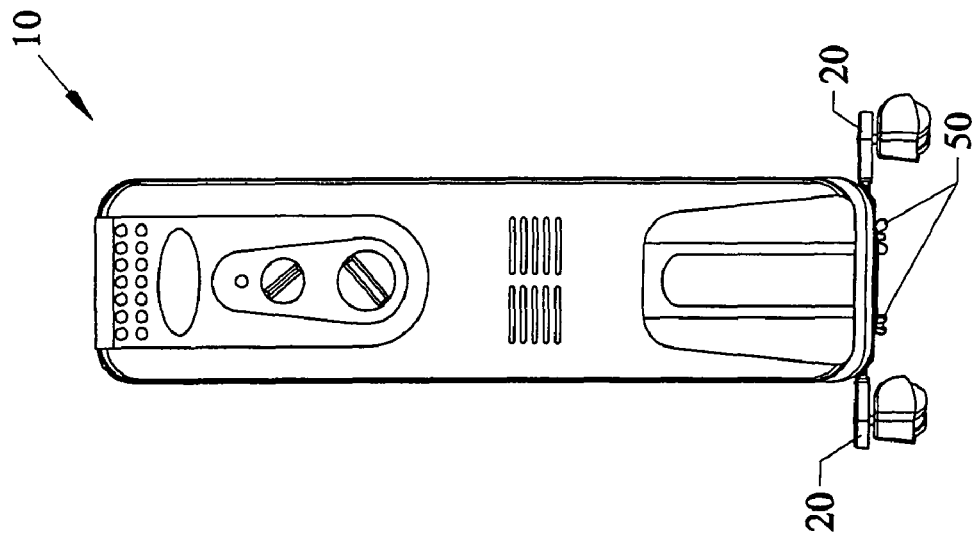
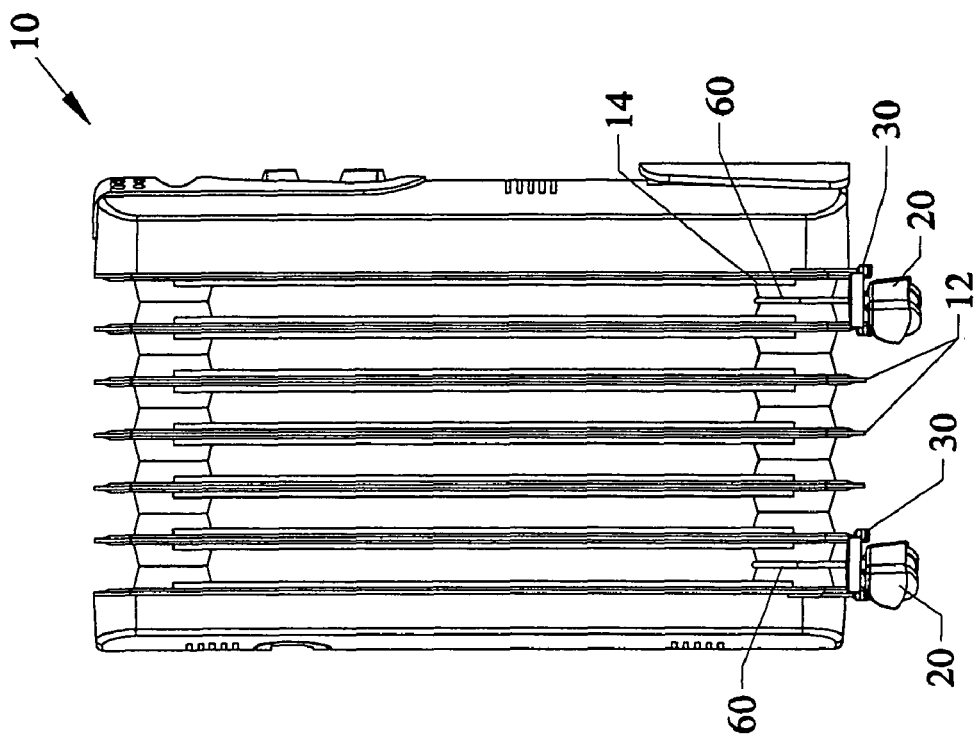

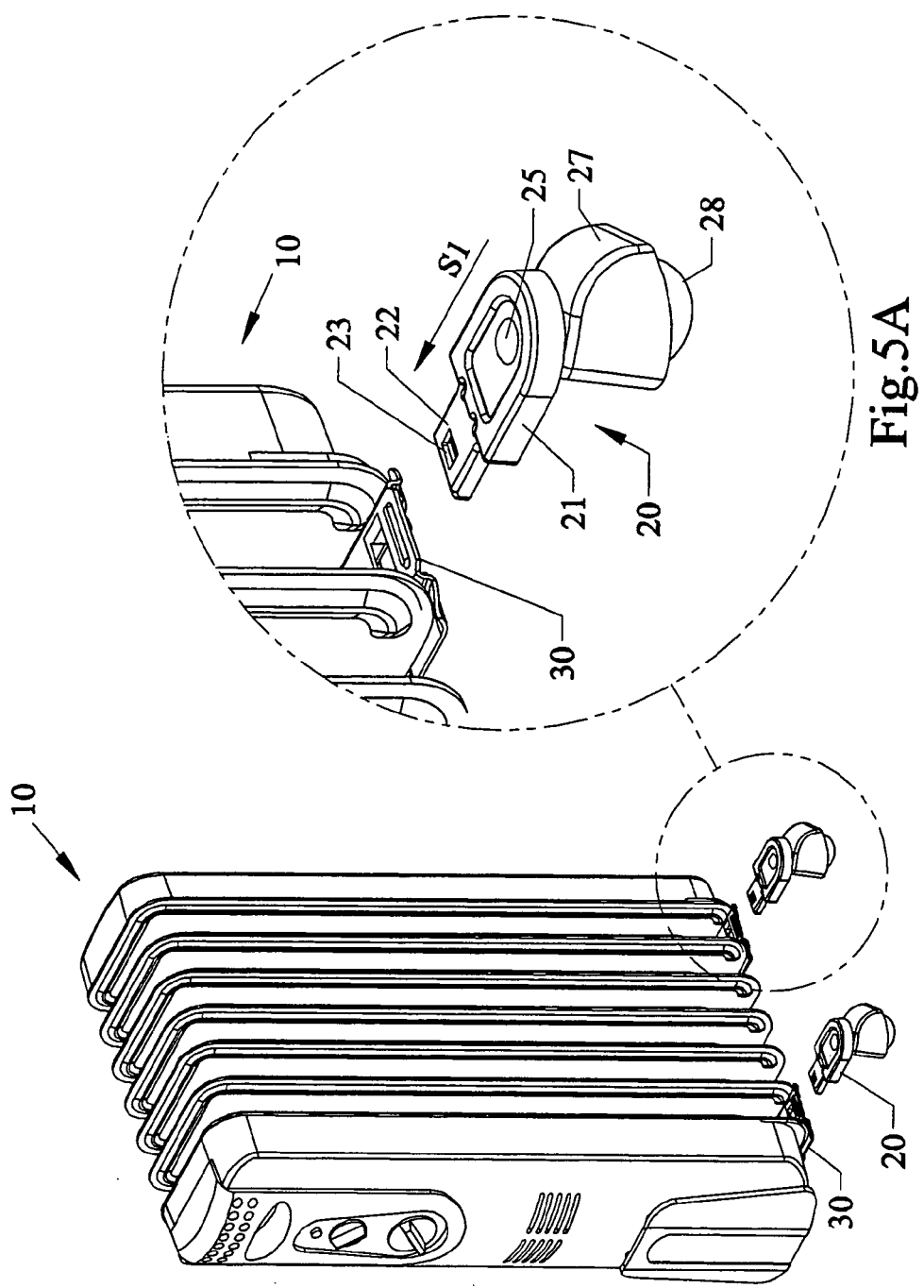

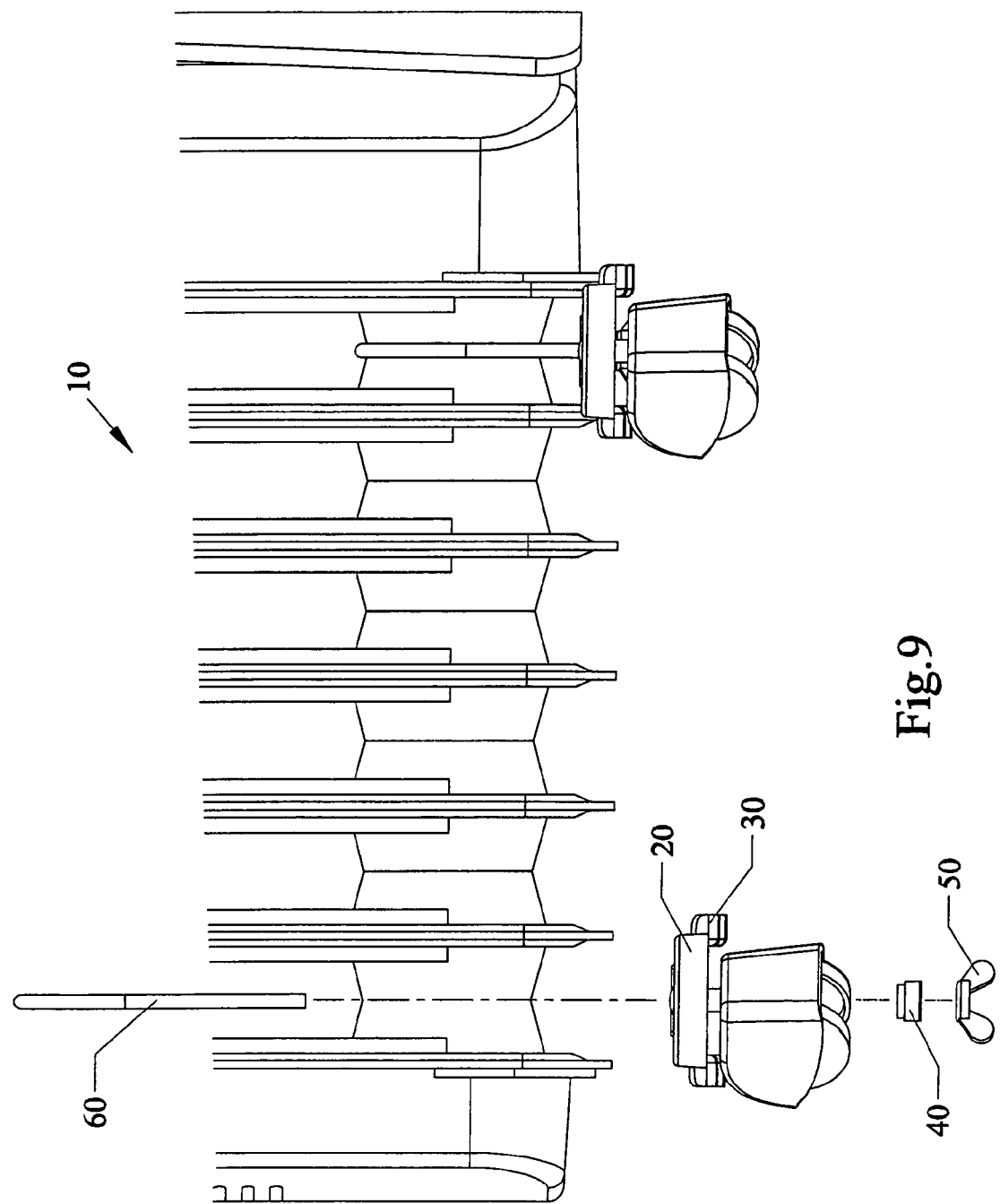

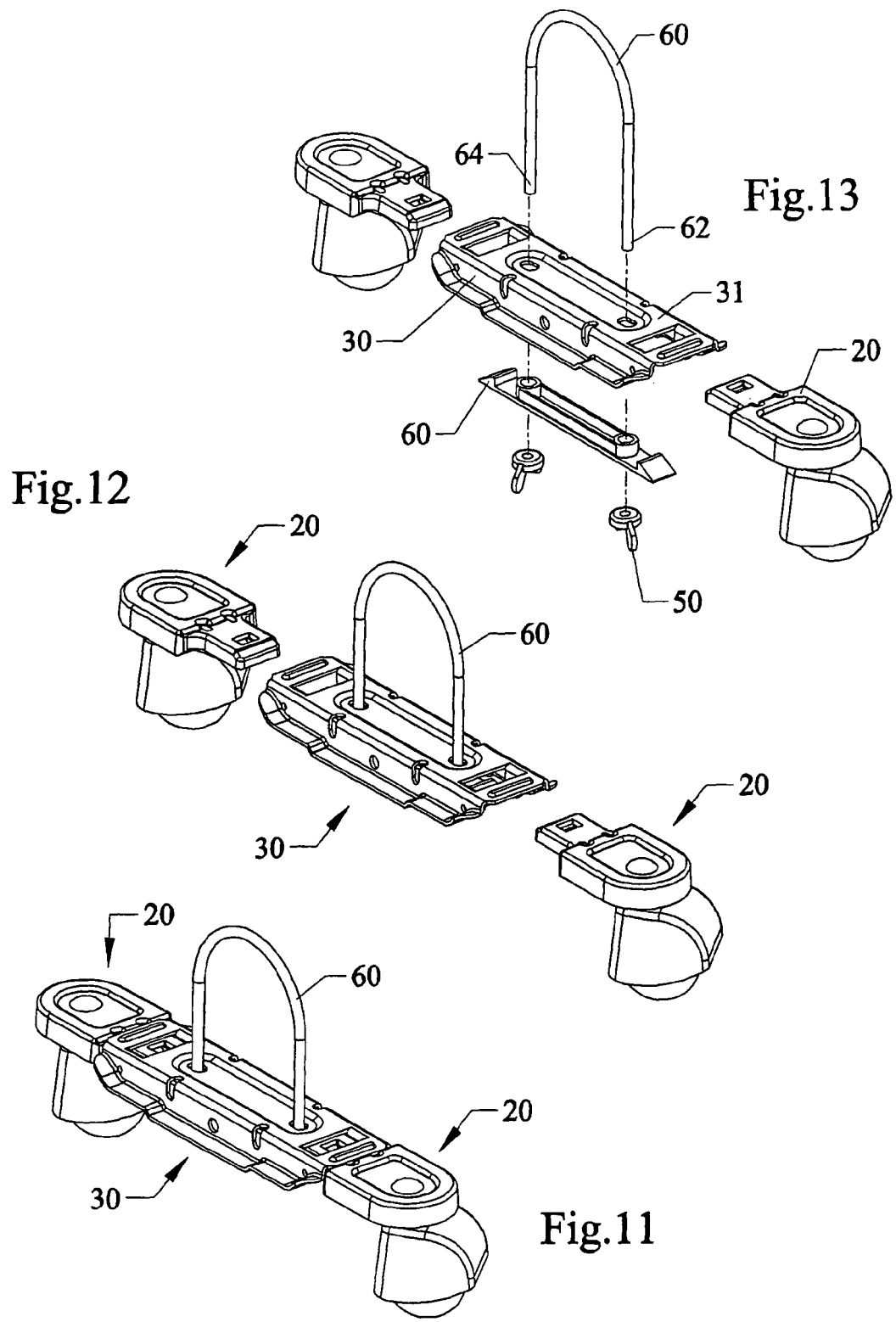

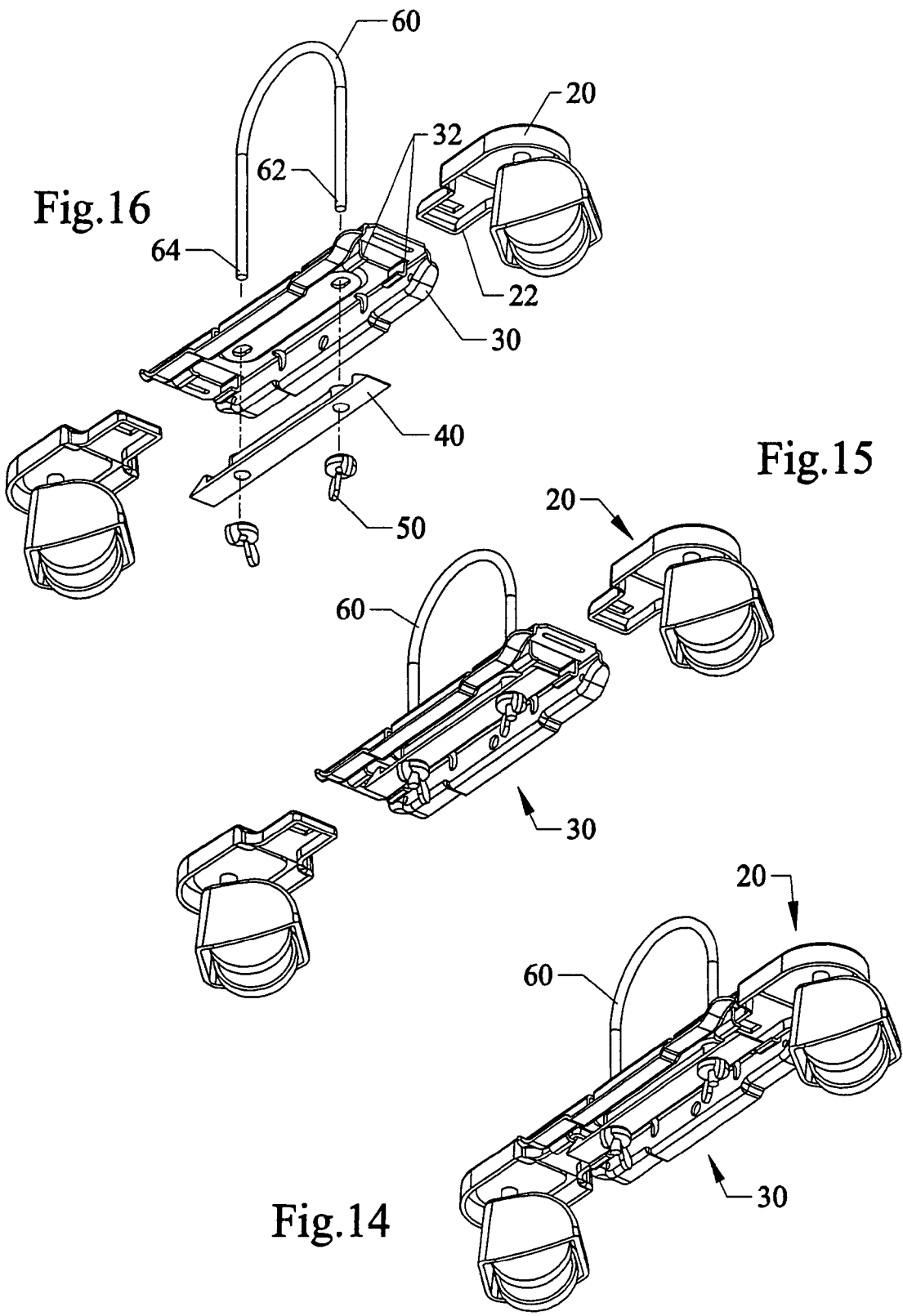

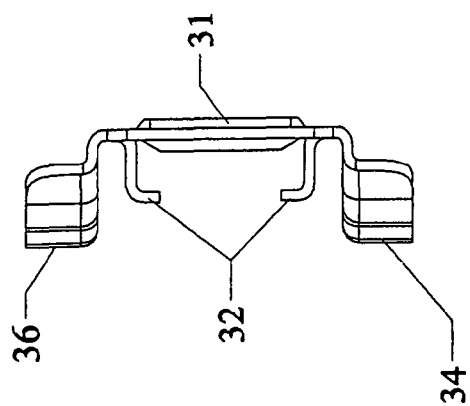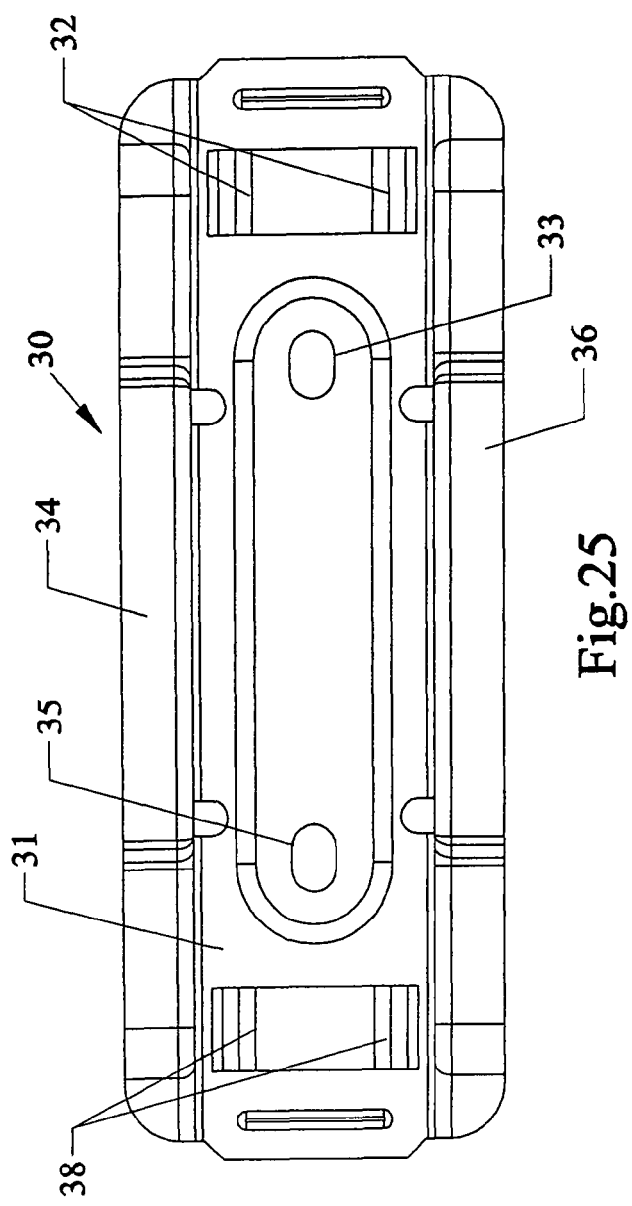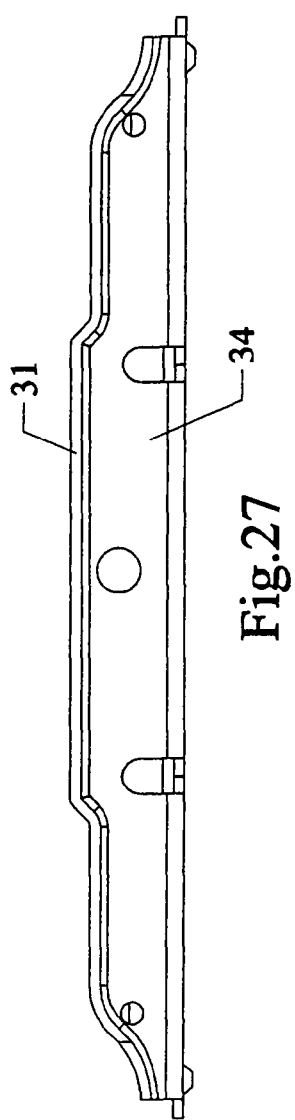

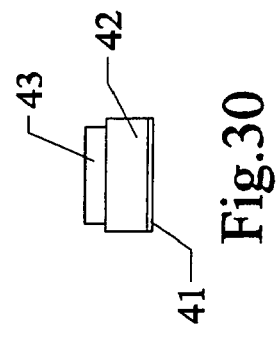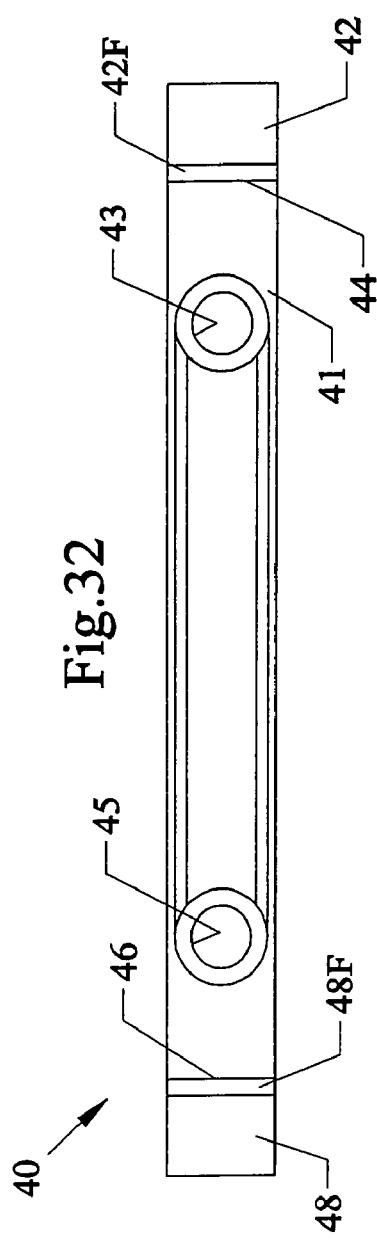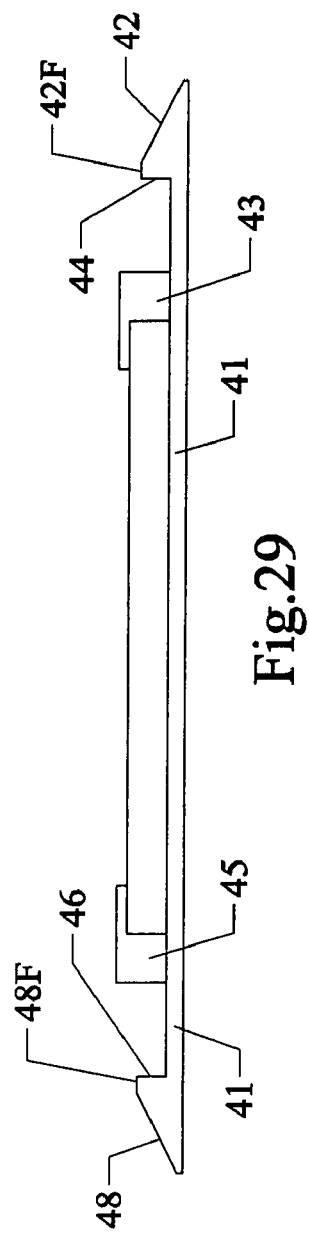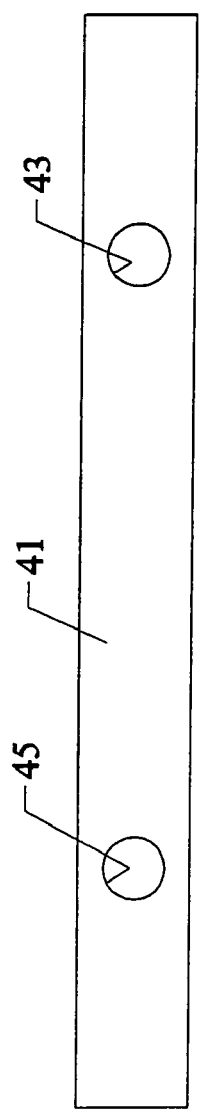

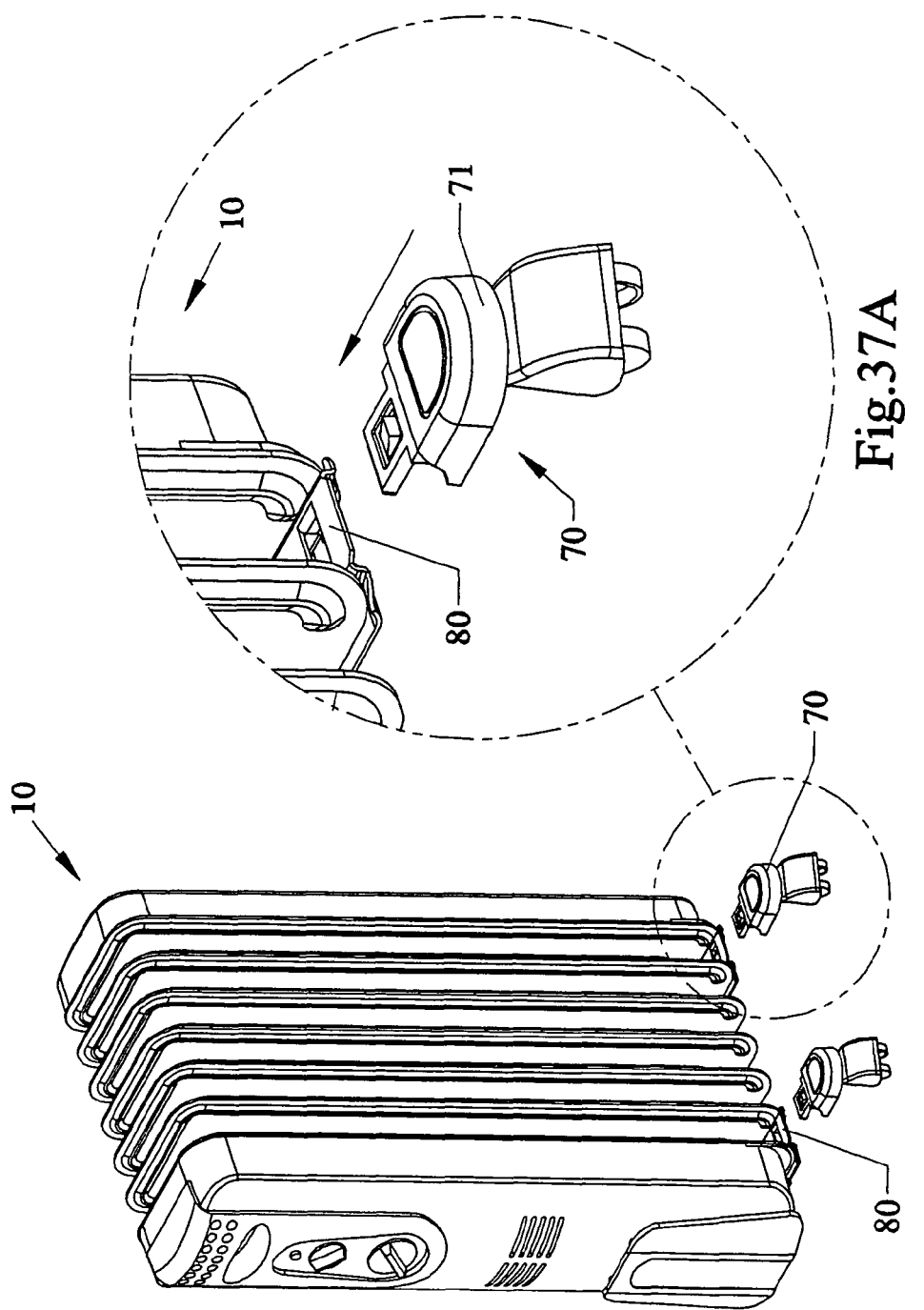

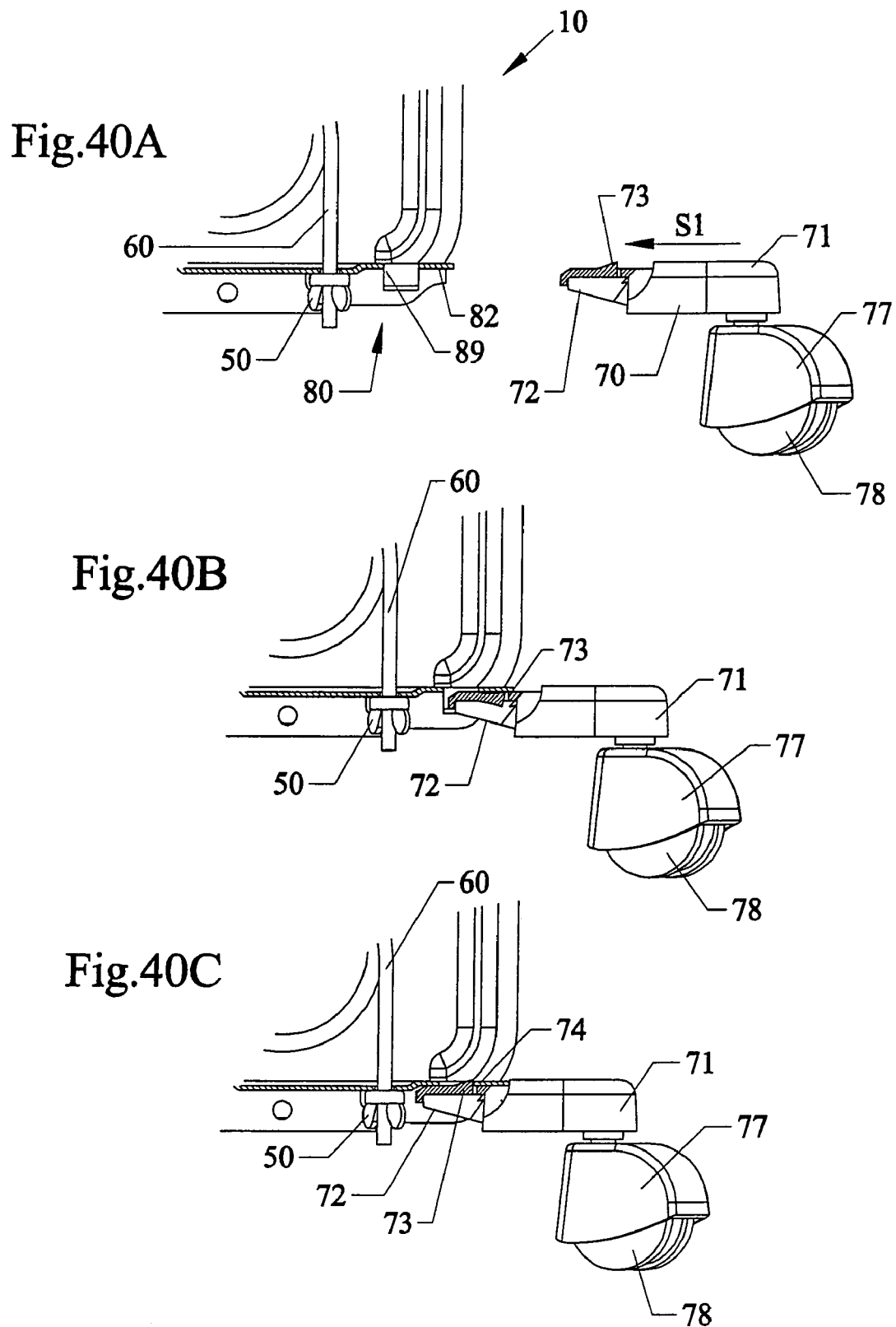

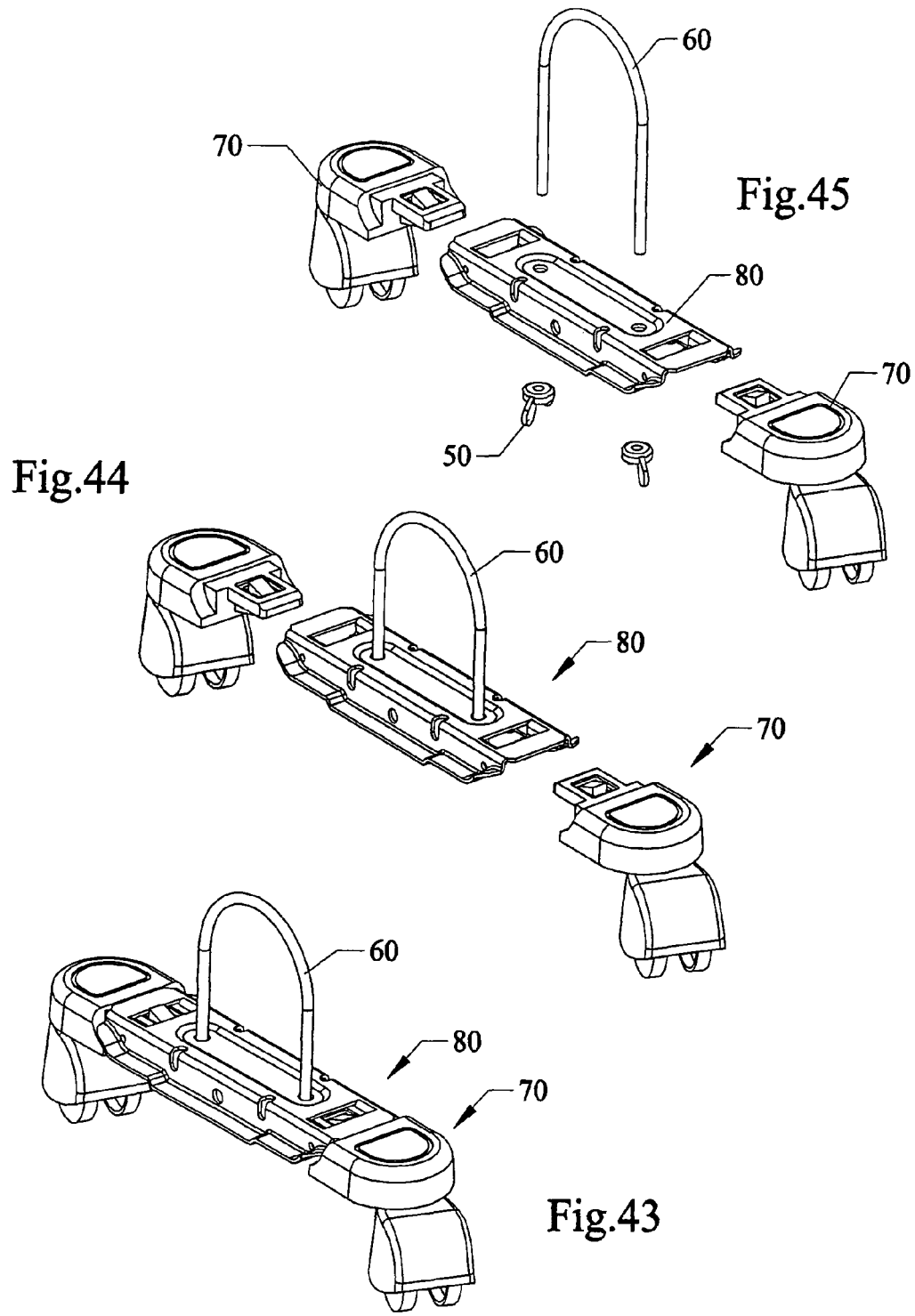

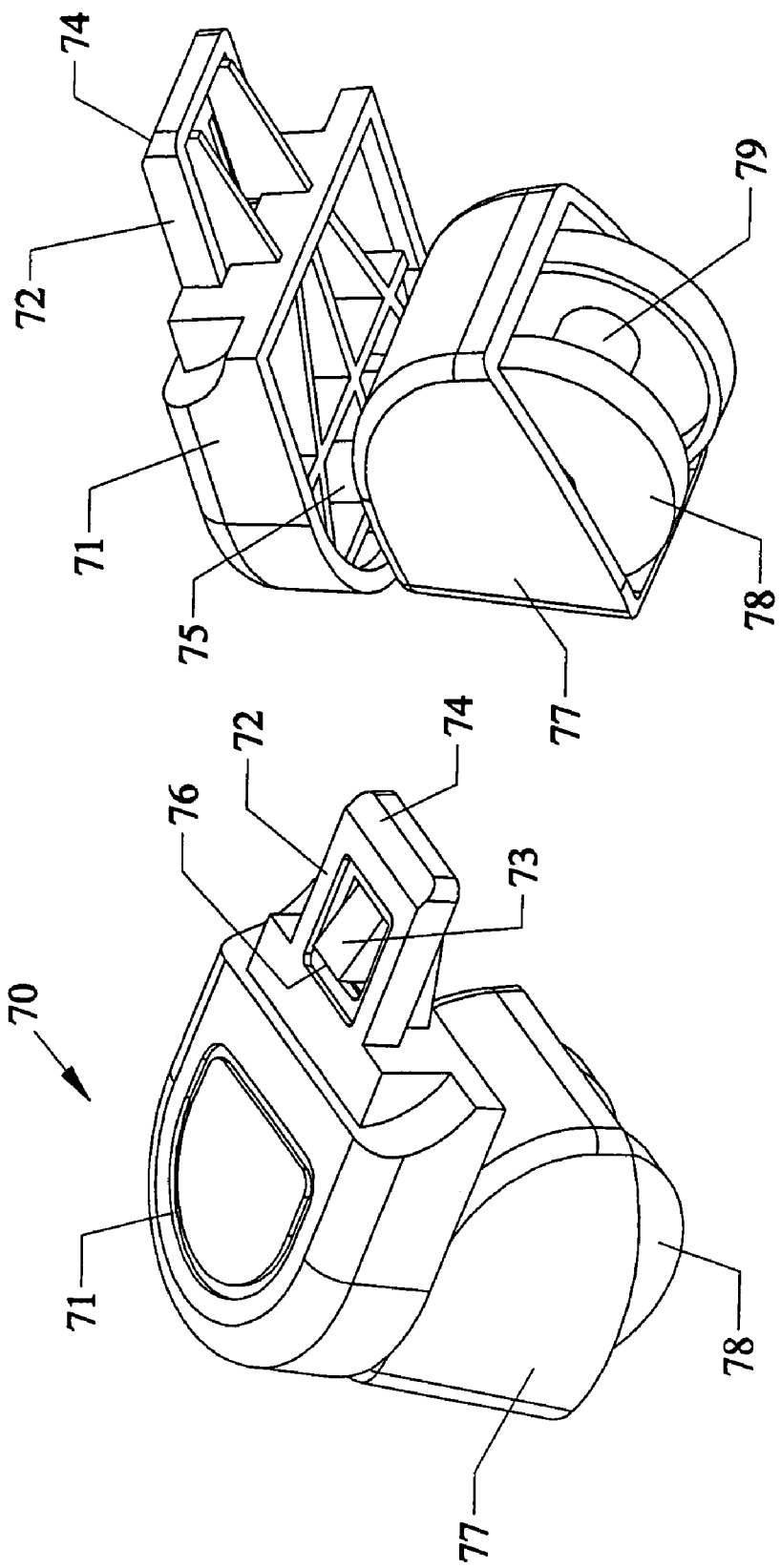

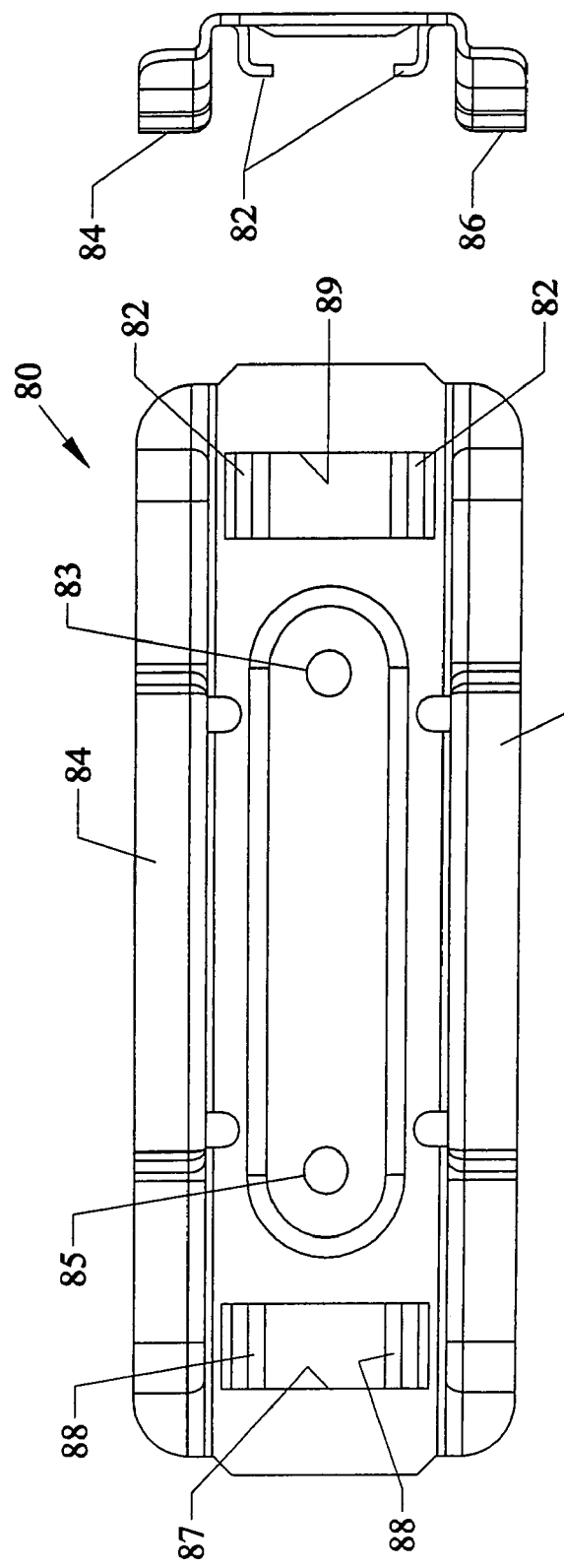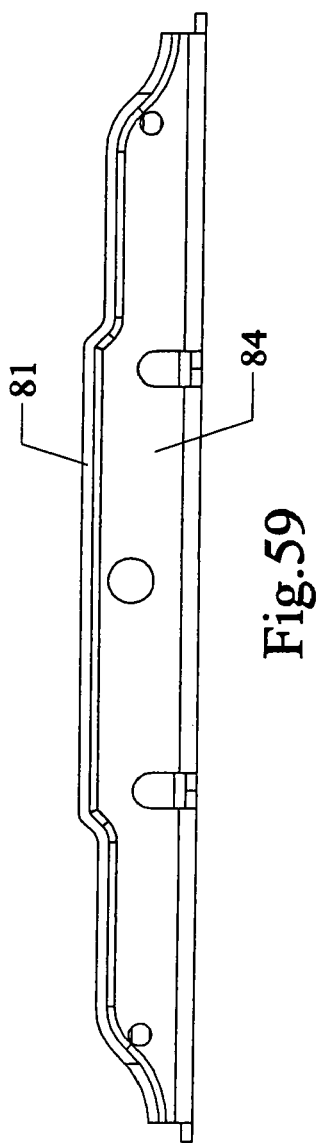
Fig.57 Fig.58 Fig.59

SNAP ON WHEELS

This invention is a Divisional Application of U.S. patent application Ser. No. 11/225,426 filed Sep. 13, 2005, now issued as U.S. Pat. No. 7,414,114 on Nov. 10, 2009.

FIELD OF INVENTION

This invention relates to wheels, in particular to easily attachable and detachable mobile support wheels, structures, assemblies, devices and methods for supporting portable environmental control units such as heaters, radiators, fans, and the like, in order to allow these units to be mobile over floor surfaces.

BACKGROUND AND PRIOR ART

Portable heaters have been growing in popularity in recent years. Making these devices easily mobile is useful for their versatility. Many portable heaters must be physically lifted and carried in order to be mobile. The lift and carry requirement is not very desirable when the heaters are often moved from place to place.

Placing wheels on portable heaters has been done over the years. See for example, U.S. Pat. Nos. 4,870,253 to De'Longhi and 6,595,200 to Dai. However, these device like many others requires generally large type wheels be permanently attached to axles underneath the heaters. The permanent type attachments do not allow for removing the wheels when needed. For example, the permanently attached wheels take up more space when the heater unit has to be packaged and shipped.

Even if these wheels were not initially attached to the heater, then the user must spend time to assemble the wheels by using tools such as but not limited to screw drivers, wrenches, and the like. So, later removing the wheels would also be a chore requiring additional manpower and time. Additionally, these large type wheels can be cumbersome to store. Additionally, these devices have many loose parts that can become lost overtime.

Attempts have been made to use smaller wheels underneath the portable heaters. See for example, U.S. Published Patent Application 2004/0245417 to De'Longhi, which describes a support for a radiator. Although these wheels are generally smaller than those referenced in the other devices above, these wheel are not intended to be removed from beneath the heater. Instead these wheels fold up underneath the heater, and still take up added space when the heater is to be shipped and stored. Additionally, the folding action can break or jam along one of the hinges. If only one hinge breaks or jams, the entire heater is no longer rollable over a ground surface.

Still furthermore, all of the prior art devices listed above require their wheels be fixed along side each of the heater units, which means they are not pivotable. These fixed wheel orientations do not allow for the heaters to be easily turned as they are being rolled.

Thus, the need exists for solutions to the above problems with the prior art.

SUMMARY OF THE INVENTION

A primary objective of the invention is to provide wheels for environmental control units such as heaters and fans, that easily snap on and are removable with ease.

A secondary objective of the invention is to provide wheels for environmental control units such as heaters and fans, that can be assembled without much labor or time.

A third objective of the invention is to provide wheels for environmental control units such as heaters and fans, which can be disassembled without much labor or time.

A fourth objective of the invention is to provide wheels for environmental control units such as heaters and fans, where the wheels can turn and pivot in place.

A fifth objective of the invention is to provide wheels for environmental control units such as heaters and fans, that can attach and detach without using tools and having loose parts.

A sixth objective of the invention is to provide wheels for environmental control units such as heaters and fans, that do not fold up underneath the unit.

A seventh objective of the invention is to provide wheels for environmental control units such as heaters and fans, that when wheels are removed allow units to be shipped and stored with less space than previous units having wheels.

A mobile support apparatus for an environmental control units that includes a bracket attached to an environmental control unit, the bracket having a first slot on one end and a second slot on a second end opposite to the first end, a first wheel rotatably attached to a first wheel holder, the first wheel holder having a first protruding end, and a second wheel rotatably attached to a second wheel holder, the second wheel holder having a first protruding end, wherein the first protruding end of the first wheel holder is inserted into the first slot of the bracket, and the second protruding end of the second wheel holder is inserted into the second slot of the bracket, so that the environmental control unit is rollable on a floor surface by the first wheel and the second wheel, and the first and second wheel holders are removable from the bracket.

The bracket can include a first snapable portion that bends and attaches the first protruding end of the first wheel holder to the first slot of the bracket, and a second snapable portion that bends and attaches the second protruding end of the first wheel holder to the second slot of the bracket. The first snapable portion and the second snapable portion can each be members that protrude upward from the first protruding end and the second protruding end, respectively.

The apparatus can include a first horizontal edge on the bracket for catching the first snapable member of the first protruding end, and a second horizontal edge on the bracket for catching the second snapable member of the second protruding end.

The apparatus can include a first horizontal edge on the first protruding end for catching the first snapable portion member of the bracket, and a second horizontal edge on the second protruding end for catching the second snapable member of the bracket.

The first slot of the bracket and the second slot of the bracket can each include a pair of bent clips facing one another having a space therebetween wherein the space forms the first and the second slots.

The apparatus can further include a first pivot member between the first wheel and the first wheel holder for allowing the first wheel to pivot and rotate relative to the first wheel holder, and a second pivot member between the second wheel and the second wheel holder for allowing the second wheel to pivot and rotate relative to the second wheel holder. The first wheel and the second wheel can each include a pair of wheels with an axle therebetween, the axle being attached to each wheel holder so that the pair of wheels rotates relative to each wheel holder.

The first wheel holder and the second wheel holder can each include a clip having bendable edges for allowing the axle to be attached and removed from each wheel holder.

The environmental control unit can be a portable heater, a portable radiator, and/or be a portable fan.

The invention can include a novel method of attaching and detaching wheels from a bracket that is attached to an environmental control unit, that can include steps for: providing an environmental control unit, providing a first wheel and a second wheel, attaching the first wheel to the environmental control unit by inserting a first protruding member into a first socket, attaching the second wheel to the environmental control unit by inserting a second protruding member inserts into a second socket, and rolling the environmental control unit on a floor surface by the first wheel and the second wheel.

Further objects and advantages of this invention will be apparent from the following detailed description of the presently preferred embodiments which are illustrated schematically in the accompanying drawings.

BRIEF DESCRIPTION OF THE FIGURES

FIG. 3 is a side view of FIG. 1.

FIG. 4 is a front end view of FIG. 1.

FIG. 5 is another view of FIG. 1 with wheels removed from the environmental control unit.

FIG. 5A is an enlarged view of one snapable wheel of FIG. 5 with the unit.

FIG. 9 is an enlarged side view of FIG. 3 with wheels attached and unattached from unit.

FIG. 11 is an upper enlarged view of an assembled bracket with attached snapable wheels.

FIG. 12 is another view of FIG. 11 with snapable wheels separated therefrom.

FIG. 13 is an exploded view of the components of FIGS. 11-12.

FIG. 14 is a lower view of the assembled bracket with attached wheels of FIG. 11.

FIG. 15 is a lower view of the snapable wheels separated from bracket of FIG. 12.

FIG. 16 is an exploded lower view of the components of FIG. 13.

FIG. 25 is a top view of the main bracket of FIG. 24.

FIG. 26 is an end view of the main bracket of FIGS. 24-25.

FIG. 27 is a side view of the main bracket of FIGS. 24-26.

FIG. 29 is a side view of the retainer clip of FIG. 28.

FIG. 30 is an end view of the retainer clip of FIG. 29.

FIG. 31 is a bottom view of the retainer clip of FIGS. 28-29.

FIG. 32 is a top view of the retainer clip of FIGS. 28-30.

FIG. 37 is another view of FIG. 33 with wheels removed from the unit.

FIG. 37A is an enlarged view of one snapable wheel of FIG. 37 with the unit.

FIG. 40A is a partial cross-sectional view of a single snapable wheel with protruding end of FIG. 39 spaced apart from the unit.

FIG. 40B is another view of FIG. 40A showing the protruding end of the wheel starting to be inserted into a socket on the unit.

FIG. 40C is another view of FIG. 40A showing the protruding end of the wheel snappably attached within the socket on the unit.

FIG. 43 is an upper enlarged view of an assembled bracket with attached snapable wheels.

FIG. 44 is another view of FIG. 43 with snapable wheels separated therefrom.

FIG. 45 is an exploded view of the components of FIGS. 43-44.

FIG. 49 is a top perspective view of a second embodiment snapable wheel holder &wheel.

FIG. 50 is bottom perspective view of the snapable wheel holder and wheel of FIG. 49.

FIG. 57 is a top view of the main bracket of FIG. 56.

FIG. 58 is an end view of the main bracket of FIGS. 56-57.

FIG. 59 is a side view of the main bracket of FIGS. 56-58.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

Figure 1:
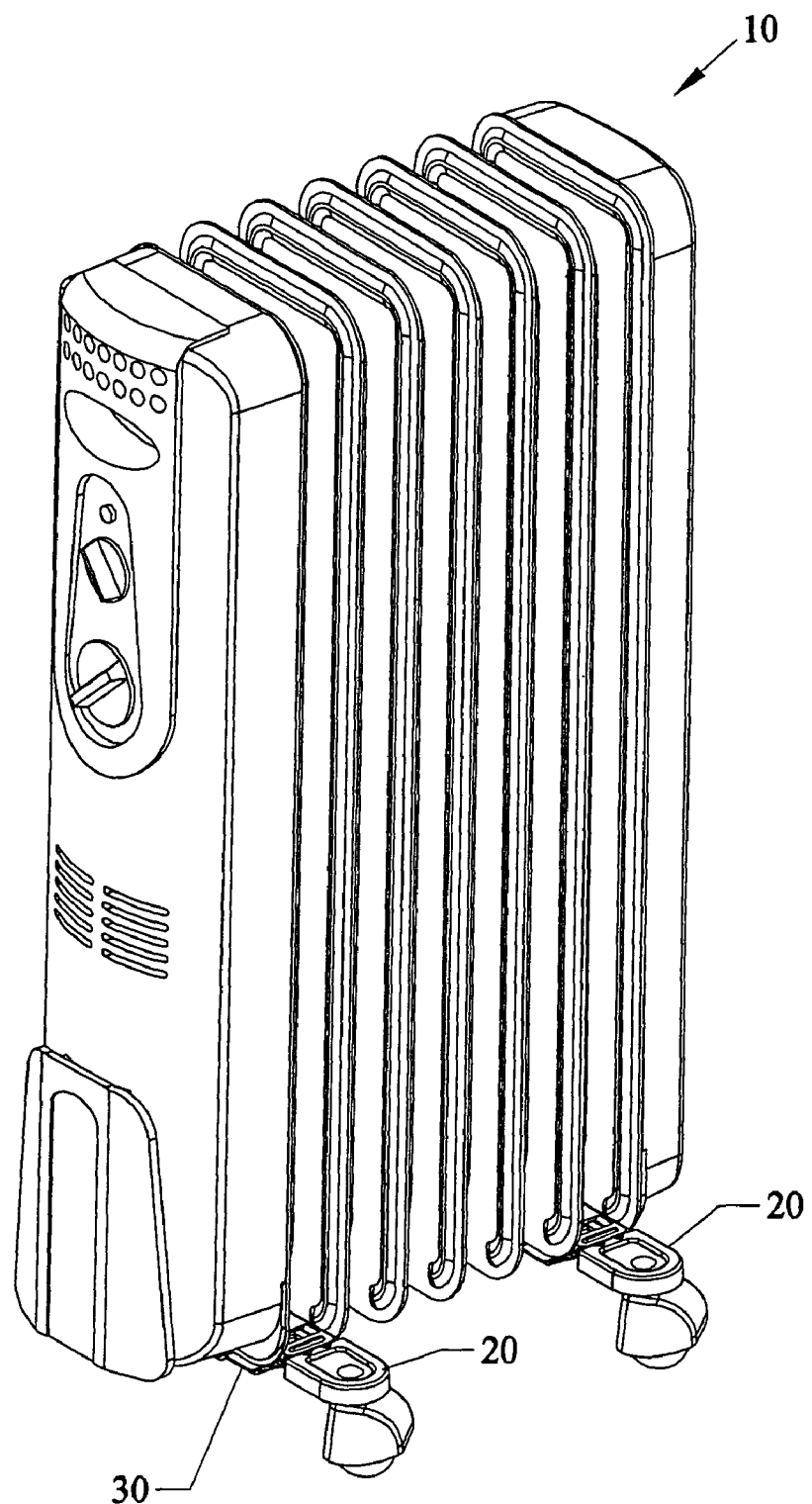
FIG. 1 is a front end and right side perspective view of an environmental control unit such as a portable radiator, with snapable wheels of a first embodiment.
Figure 2:
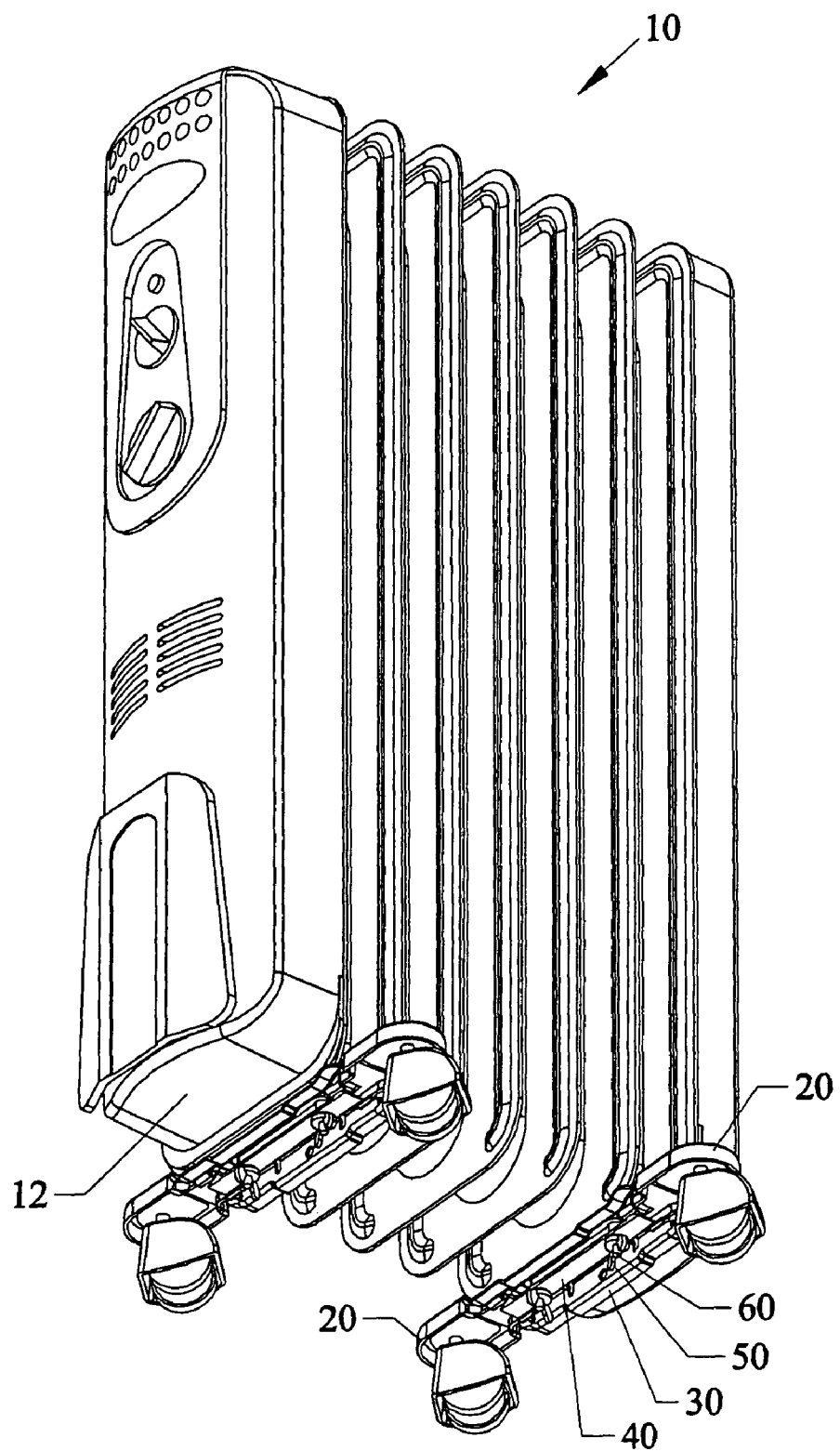
FIG. 2 is a bottom perspective view of FIG. 1.

10 First Embodiment Heater unit such as radiator with Snapable wheels
12 Undersurface of unit (bottom edges of radiator heat exchange fins)
14 Lower horizontal support member of radiator
20 Snapable wheel holder (metal)
21 Main horizontal support member
22 Male protruding end
23 rectangle catch slot in protruding end
24 wedge shaped tip
25 pivot fastener
27 shield cover for wheel(s)
28 wheel(s)/caster(s)
29 axle
S1 direction protruding end slides into main bracket
30 Main bracket
31 horizontal planar portion
32 first socket end (formed from bent L-shapes facing one another)
33/35 through-holes for attachment to U-bar clamps
34/36 bent sides of bracket
38 second socket end (formed from bent L-shapes facing one another)
40 Retainer clip
41 narrow elongated portion
42 first sloping upward from narrow tip end/angled edge
42F first flat apex portion
44 first vertical wall catch
43/45 cylinder portions with through-holes
48 second sloping upward from narrow tip end/angled edge
48F second flat apex portion
46 second vertical wall catch
50 Wing Nut
60 U-Bar Clamp
62/64 threaded ends
70 Second embodiment snapable wheel holder (plastic)
71 main horizontal support member
72 male protruding end
73 rearwardly facing tab (triangular side shape) with sloping upward top surface
74 wedge shaped tip
76 vertical wall catch
75 pivot fastener
77 shield cover for wheel(s)
78 wheel(s)/caster(s)
79 axle
80 Second embodiment main bracket
81 horizontal planar portion
82 first socket end (formed from bent L-shapes facing one another)
83/85 through-holes for attachment to U-bar clamps
84/86 bent sides of bracket
88 second socket end (formed from bent L-shapes facing one another)
87 first catch opening in planar portion
89 second catch opening in planar portion First Embodiment FIG. 1 is a front end and right side perspective view of an environmental control unit 10 such as but not limited to a portable radiator, that uses the invention of a snapable wheel holder housing that can attach to a main bracket 30 that can be fastened beneath the unit. FIG. 2 is a bottom perspective view of FIG. 1 showing the wheel holder 20, attached to main bracket 30 by retainer clip 40, where a fastener such as but not limited to a wing nut 50 attaches the retainer clip 40 and main bracket 30 to undersurface 12 of unit 10 by a U-bar clamp 60. FIG. 3 is a side view of FIG. 1 showing a side portion of the U-bar clamp 60 about a lower horizontal support member 14 of the radiator unit 10. FIG. 4 is a front end view of FIG. 1.

FIG. 5 is another view of FIG. 1 with snapable wheel holder 20 removed from the environmental control unit 10. FIG. 5A is an enlarged view of one snapable wheel holder 20 of FIG. 5 separated from the radiator unit 10. The wheel holder 20 includes a main horizontal support member 21 with a male end 22 protruding in a horizontal direction therefrom having a rectangular catch slot 23 that can slide in the direction of arrow S1 to lock onto the retainer clip 40 which is shown and described in relation to FIGS. 8A-8C, 10, and 13-16. A pivotable fastener 25 such as but not limited to a bolt with plural nuts and washers, can attach the main horizontal support member 21 to the wheel/caster shield cover 27 so that the shield cover 27 can pivot relative to the support member 21. The shield cover can rotatably support wheel(s)/caster(s) 28 inside that allow the unit 10 to roll over various floor surfaces.

Figure 7:
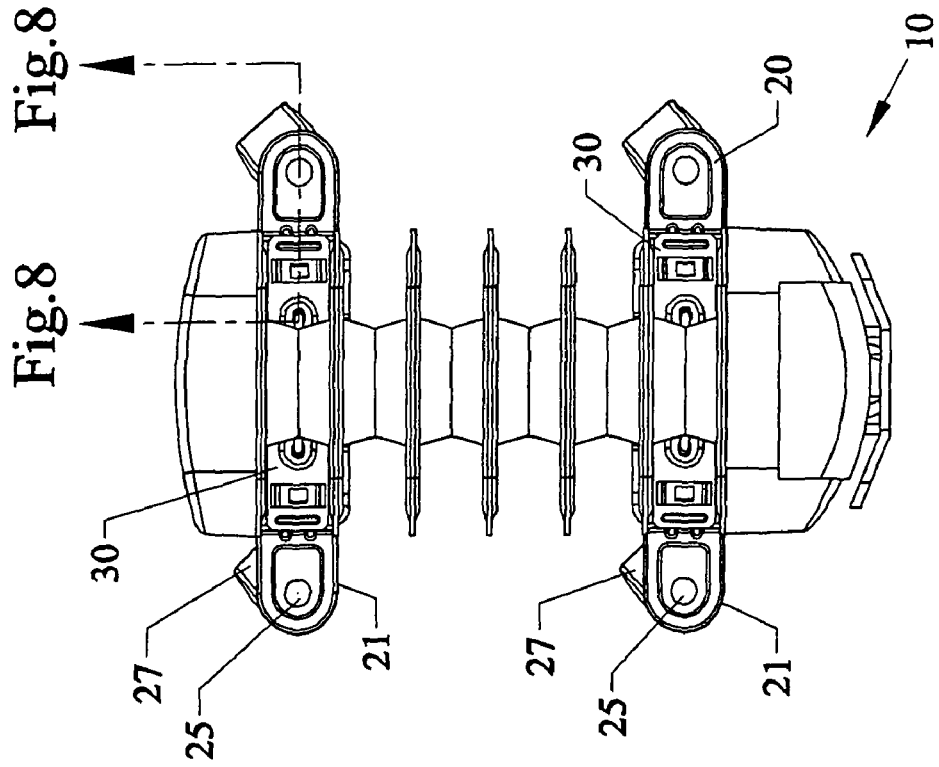
FIG. 7 is a top view of the first embodiment of FIG. 6.
Figure 6:
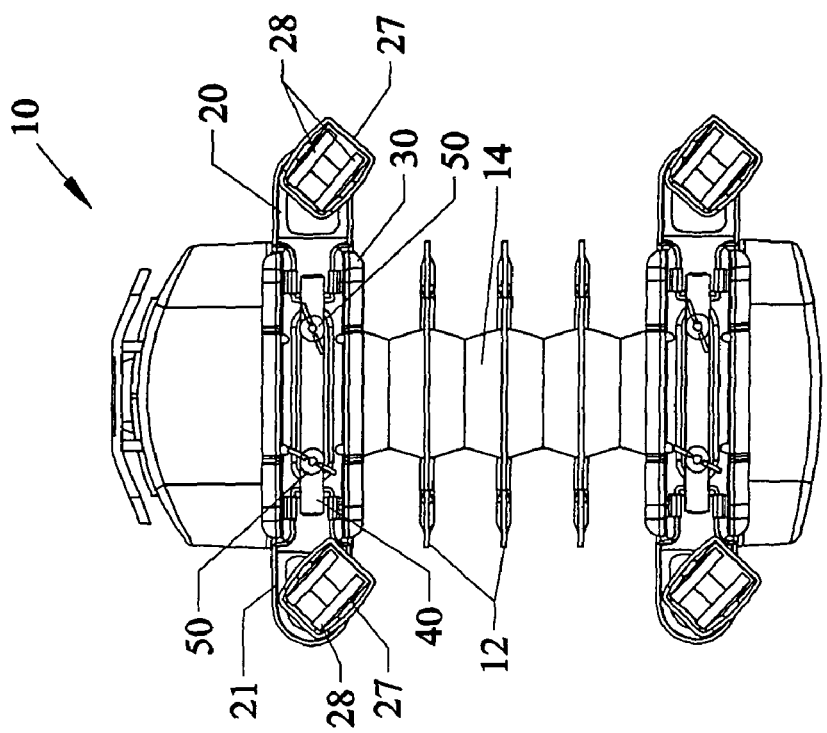
FIG. 6 is a bottom view of the first embodiment with wheels tilted relative to the unit.

FIG. 6 is a bottom view of the first embodiment with wheels 28 in their respective shield cover(s) 27 tilted relative to the unit 10. FIG. 7 is a top view of the first embodiment of FIG. 6 showing how the attached snappable wheel holder(s) 20 whiled attached to main brackets 30 extend out perpendicular to both sides of unit 10. In a preferred embodiment, two main brackets 30 can be attached beneath the unit 10, and a total of four snapable wheel holders 20 can attach to the brackets 30 to rollably support the unit 10 over a floor surface.

Figure 8A:
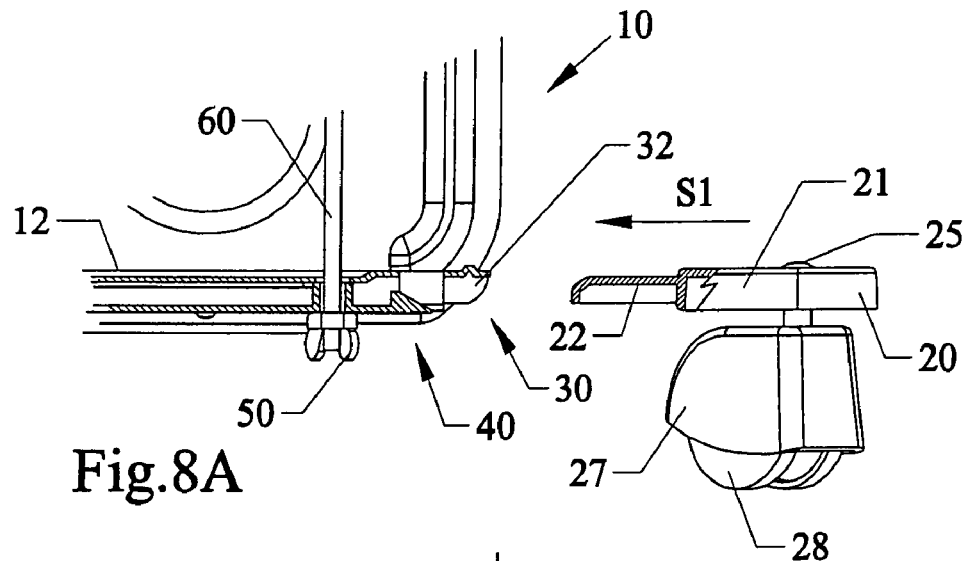
FIG. 8A is a partial cross-sectional view of a single snapable wheel with protruding end of FIG. 7 spaced apart from the unit.
Figure 8B:
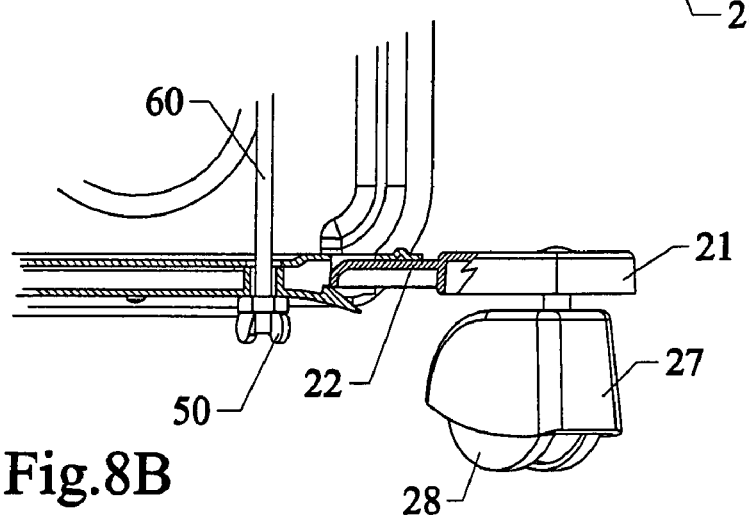
FIG. 8B is another view of FIG. 8A showing the protruding end of the wheel starting to be inserted into a socket on the unit.
Figure 8C:
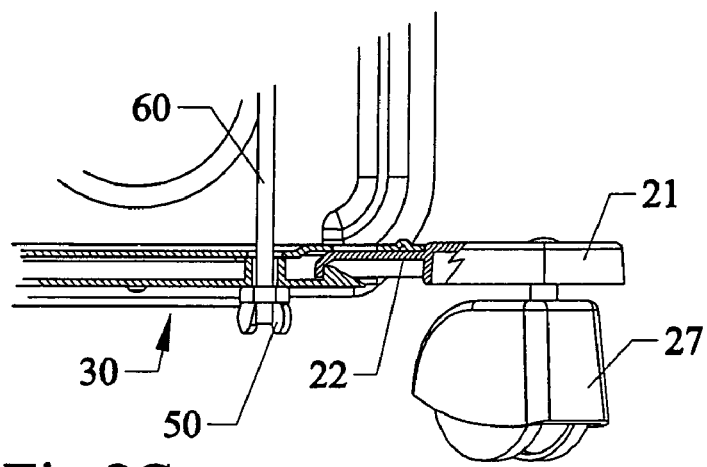
FIG. 8C is another view of FIG. 8A showing the protruding end of the wheel snappably attached within the socket on the unit.

FIG. 8A is a partial cross-sectional view of a single snapable wheel holder 20 with protruding end 22 of FIG. 7 spaced apart from the unit 10, and to be moved in the direction of arrow S1 into the slot end 32 of the main bracket 30, the latter of which will be shown and described in greater detail in reference to FIGS. 10-16 and 24-27. FIG. 8B is another view of FIG. 8A showing the protruding end 22 of the wheel holder 20 starting to be inserted into a socket end 32 of the main bracket 30 underneath the unit 10. FIG. 8C is another view of FIG. 8A showing the protruding end 22 of the wheel holder 20 snappably attached within the socket end 32 of the main bracket 30 on the unit 10.

FIG. 9 is an enlarged side view of FIG. 3 showing a single wheel holder 20 attached to main bracket 30 on the unit 10, and another wheel holder 20 unattached from unit 10.

Figure 10:
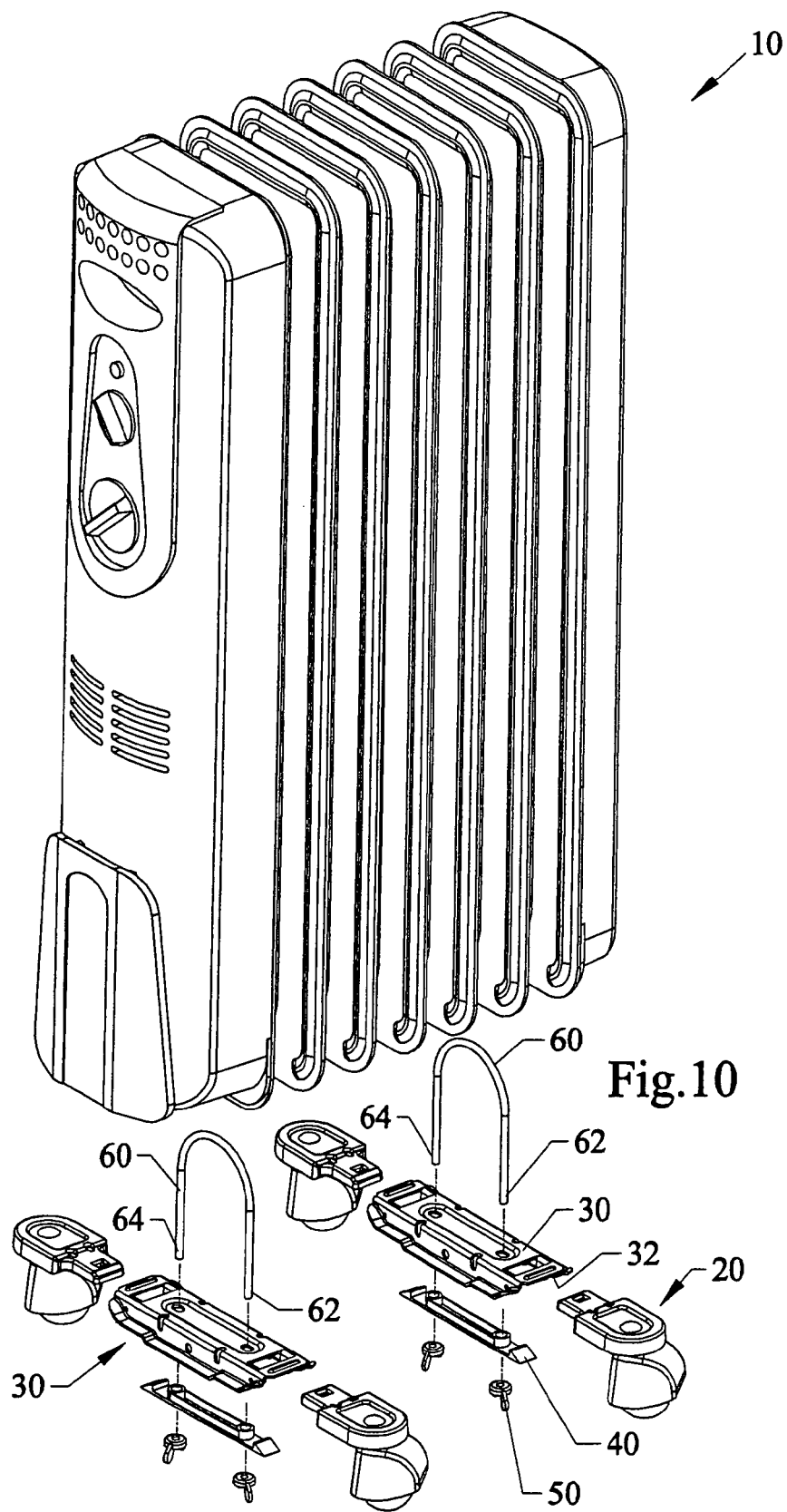
FIG. 10 is an exploded perspective view of FIG. 1 of the snapable wheels and brackets.

FIG. 10 is an exploded perspective view of FIG. 1 of the snapable wheel holders 20 and brackets 30, and retainer clips 40, and U-bar clamps 60 (each with threaded ends 62, 64), wing nuts 50.

FIG. 11 is an upper enlarged view of the main bracket 30 with attached U-bar clamp 60 attached to snapable wheel holders 20. FIG. 12 is another view of FIG. 11 with snapable wheel holders separated from the main bracket 30. FIG. 13 is an exploded view of the components of FIGS. 11-12 separated from one another.

FIG. 14 is a lower view of the main bracket 30 with attached U-bar clamp 60 attached to snapable wheel holders 20 of FIG. 11. FIG. 15 is a lower view of the snapable wheel holders 20 separated from the main bracket 30 of FIG. 12. FIG. 16 is a lower exploded view of the components of FIG. 13.

Figure 18:
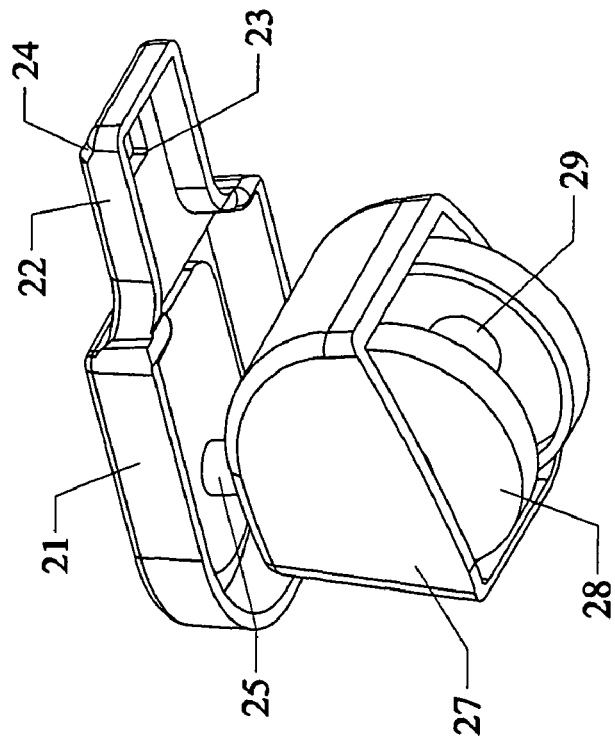
FIG. 18 is bottom perspective view of the snapable wheel holder and wheel of FIG. 18.
Figure 17:
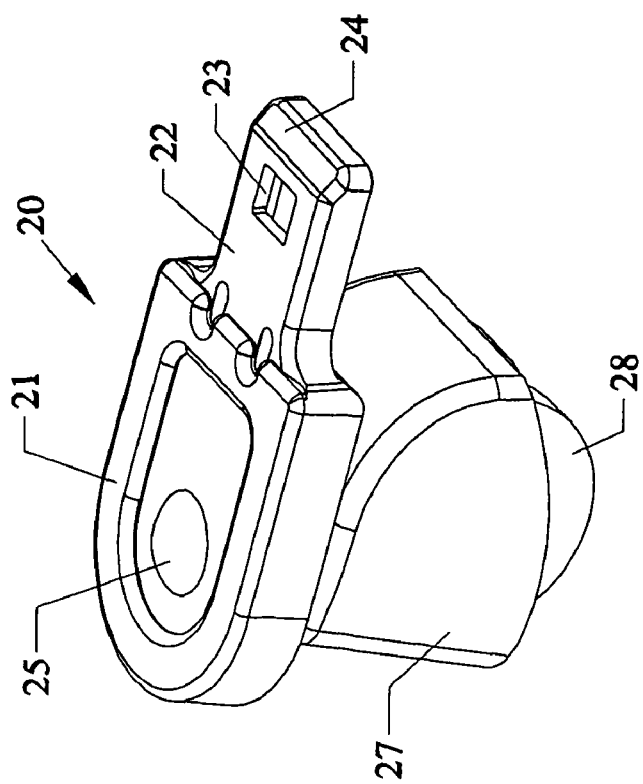
FIG. 17 is a top perspective view of a single snapable wheel holder and wheel.
Figure 21:
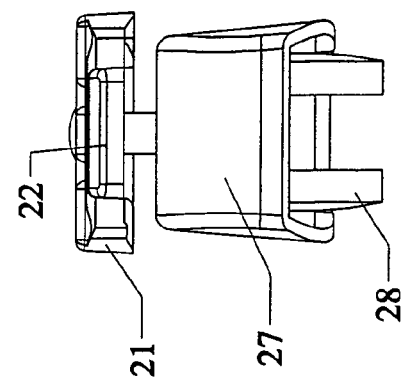
FIG. 21 is rear view of the snapable wheel holder and wheel of FIGS. 19-20.
Figure 23:
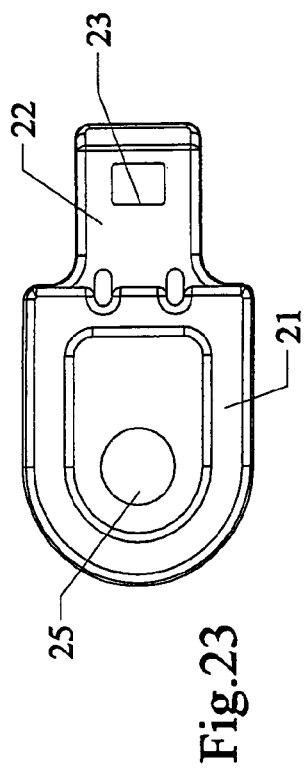
FIG. 23 is a top view of the snapable wheel holder and wheel of FIGS. 19-22.
Figure 20:
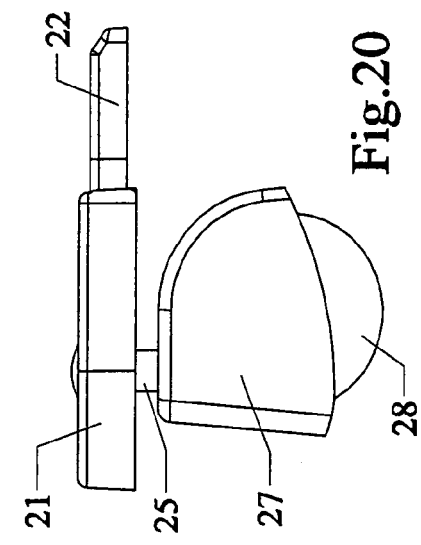
FIG. 20 is a side view of the snapable wheel holder and wheel of FIG. 19.
Figure 22:
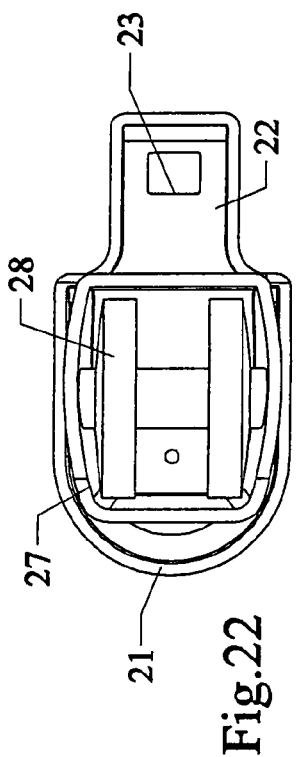
FIG. 22 is a bottom view of the snapable wheel holder and wheel of FIGS. 19-21.
Figure 19:
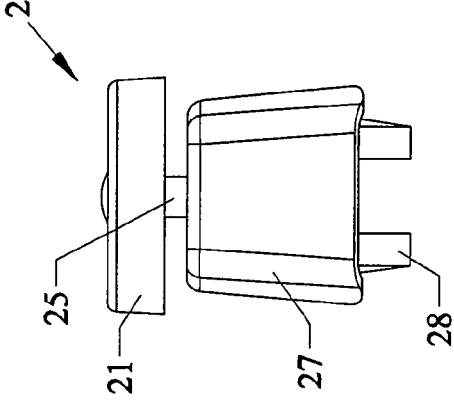
FIG. 19 is a front view of the snapable wheel holder and wheel of FIGS. 17-18.

FIG. 17 is a top perspective view of a single snapable wheel holder 20 and wheel(s) 28. FIG. 18 is bottom perspective view of the snapable wheel holder 20 and wheel(s) 28 of FIG. 18. FIG. 19 is a front view of the snapable wheel holder 20 and wheel(s) 28 of FIGS. 17-18. FIG. 20 is a side view of the snapable wheel holder 20 and wheel(s) of FIG. 19. FIG. 21 is rear view of the snapable wheel holder 20 and wheel(s) 28 of FIGS. 19-20. FIG. 22 is a bottom view of the snapable wheel holder 20 and wheel(s) 28 of FIGS. 19-21. FIG. 23 is a top view of the snapable wheel holder 20 and wheel(s) 28 of FIGS. 19-22.

Referring to FIGS. 17-23, single wheel holder 20 can have a main horizontal support member 21 with a male end 22 protruding in a horizontal direction therefrom having a rectangular catch slot 23 that can slide in the direction of arrow S1 to lock onto the retainer clip 40 which is shown and described in relation to FIGS. 8A-8C, 10, and 13-16 and 28-32. A pivotable fastener 25 such as but not limited to a bolt with plural nuts and washers, can attach the main horizontal support member 21 to the wheel/caster shield cover 27 so that the shield cover 27 can pivot relative to the support member 21.

The shield cover 27 can rotatably support wheel(s)/caster(s) 28 inside that allow the unit 10 to roll over various floor surfaces. A preferred embodiment can have a pair of disc type wheels attached to one another by an axle 29, that can snap into a standard clip (not shown) inside of the shield cover 27. Alternatively, a caster type wheel such as a ball can be rotatably supported underneath the shield cover 27.

The horizontal support member 21 with a male end 22 protruding therefrom can be formed from metal such as galvanized metal, aluminum, and the like, and the shield cover 27 and wheel(s)/caster(s) 28 can be formed from plastic. Alternatively, these pieces can all be formed from metal. Alternatively, all of these pieces can all be formed from plastic. Still furthermore, these pieces can be formed from any combination of plastic and metal, and the like.

Figure 24:
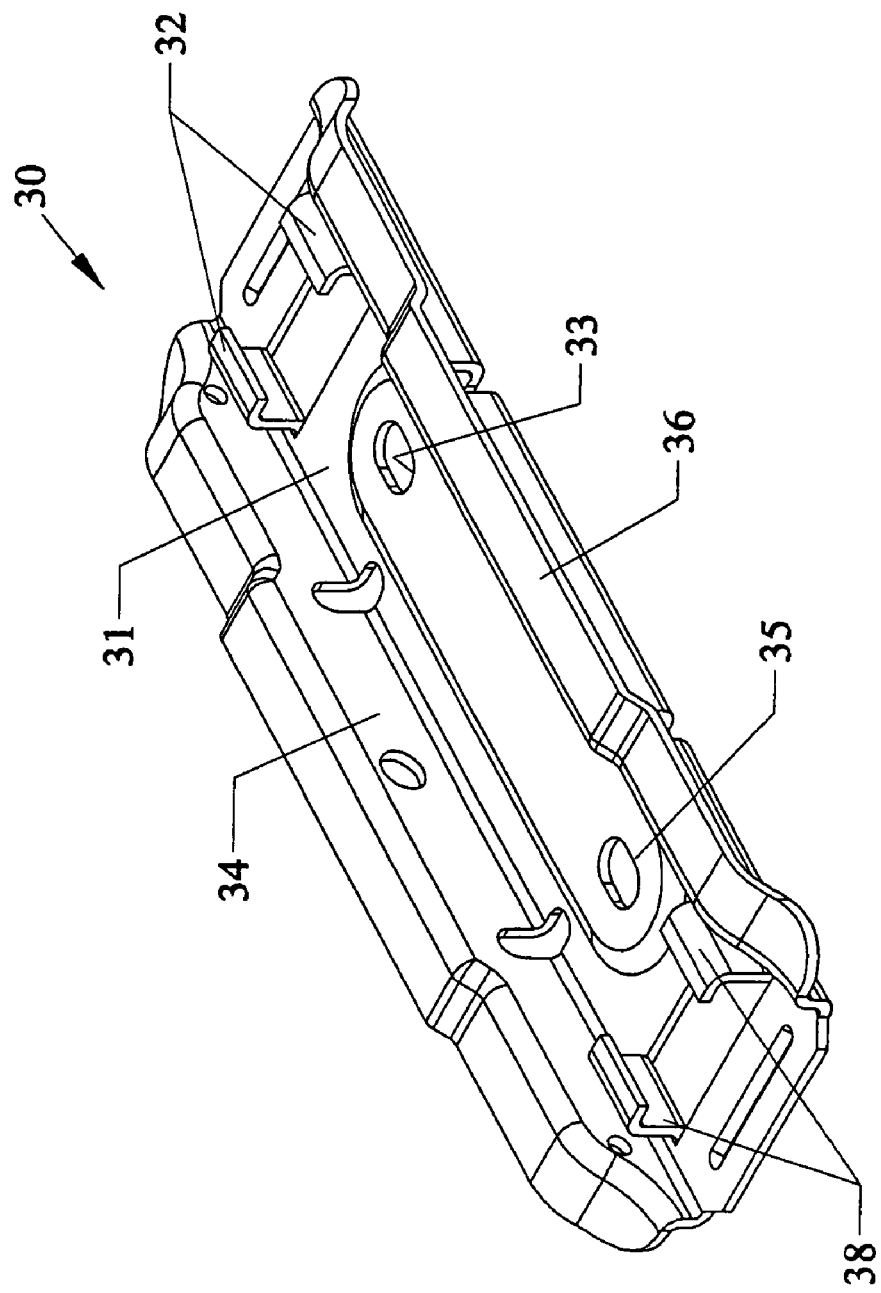
FIG. 24 is a bottom perspective view of the main bracket used for attaching the wheels thereto of the preceding figures.

FIG. 24 is a bottom perspective view of the main bracket 30 used for attaching the wheel holders 20 thereto of the preceding figures. FIG. 25 is a top view of the main bracket 30 of FIG. 24. FIG. 26 is an end view of the main bracket 30 of FIGS. 24-25. FIG. 27 is a side view of the main bracket 30 of FIGS. 24-26.

Referring to FIGS. 24-27, main bracket 30 can have a horizontal planar portion 31, a first end 32 having a pair of bent L-shaped portions facing one another extending below one end of the bracket 30. On an opposite second end 38 of the bracket 30 can be another pair of bent L-shaped portions facing one another extending below the bracket 30 as well. Each pair 32 and 38 of bent L-shaped portions forms a slot for receiving the protruding end 22 of the wheel holders 20 that were previously described.

Two through-holes 33, 35 pass through mid-portions of the horizontal planar portion 31 of the bracket 30 and can be used for attaching the bracket 30 to the U-bar clamp 60 and retainer clip 40. The sides 34, 36 of the main bracket 30 can be bent so that the sockets 32, 38 formed by the pairs of bent L-shaped portions 32, 38 are located within channels below the depth formed by the sides 34, 36.

Figure 28:
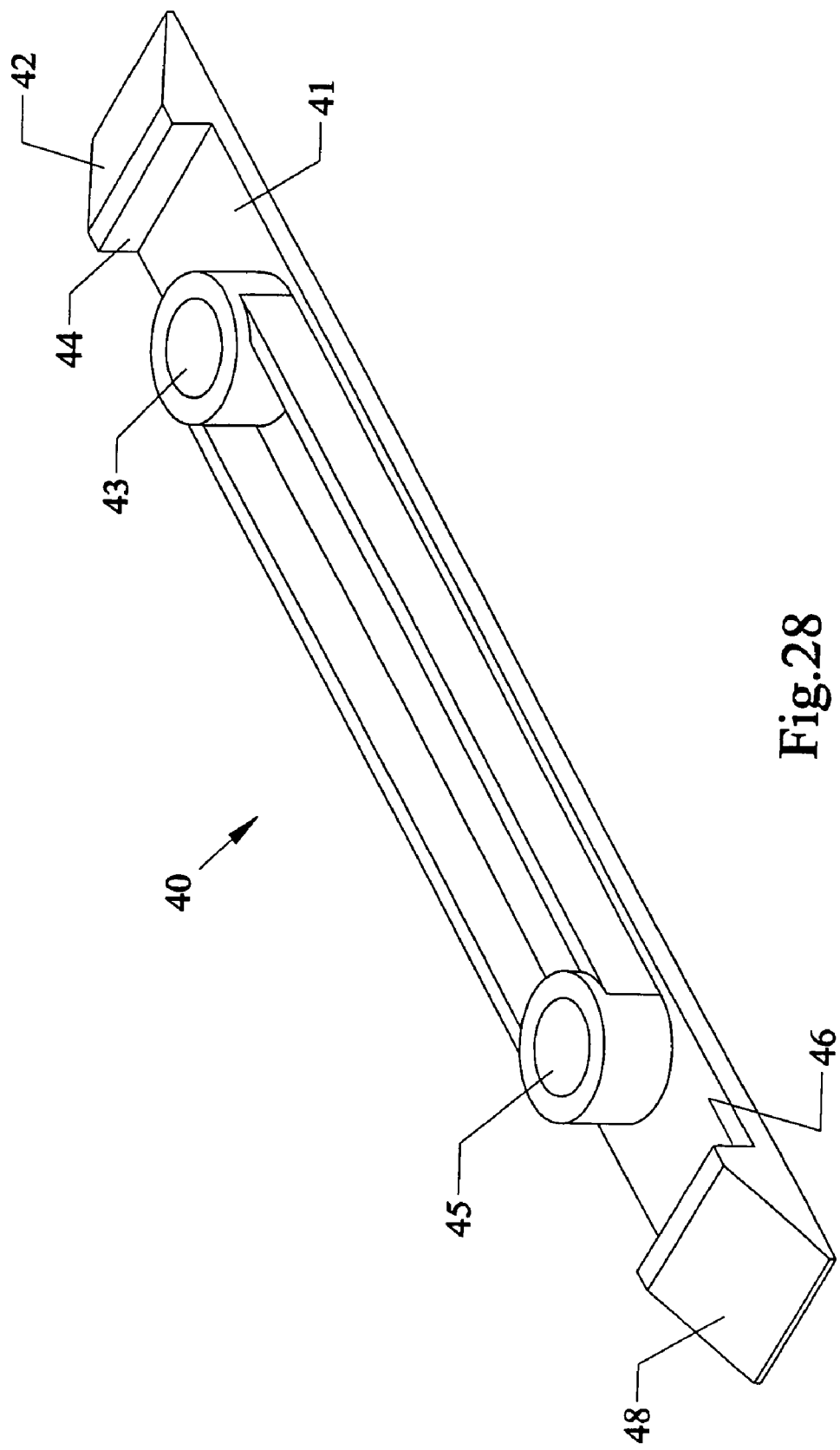
FIG. 28 is a top perspective view of the retainer clip for use with main bracket of the preceding figures.

FIG. 28 is a top perspective view of the retainer clip 40 for use with main bracket 30 of the preceding figures. FIG. 29 is a side view of the retainer clip 40 of FIG. 28. FIG. 30 is an end view of the retainer clip 40 of FIG. 29. FIG. 31 is a bottom view of the retainer clip 40 of FIGS. 28-29. FIG. 32 is a top view of the retainer clip 40 of FIGS. 28-30.

Referring to FIGS. 28-32, retainer clip 40 can include a narrow elongated portion 41 having opposite ends that have generally narrow sharp tip ends. One end can include an angled edge 42 that rises from the narrow tip to a flat apex portion 42F, and a vertical wall catch portion 44, wherein the angled edge 42 and vertical wall portion 44 have a generally right angle appearance. The opposite end can include an angled edge 48 that rises from the narrow tip to a flat apex portion 48F, and a vertical wall catch portion 46, wherein the angled edge 48 and vertical wall portion 46 also have a generally right angle appearance. Cylinder portions 43, 45 (having through-holes therethrough) each can have a height greater than that of the vertical wall portions 44, 46, and can be positioned generally along a midportion of the narrow elongated portion 41 of the clip 40.

An assembly of the components will now be described. Initially an assembler can take two main brackets 30 and attach each underneath the radiator unit 10 by the U-bar clamps 60. Referring to FIGS. 2, 3, 6, 7, 8A-8C, 9, 10, 13, 16, 24-27, the U-bar clamps 60 can be hung from the lower horizontal support member 14 of the radiator in locations between the heat exchanger fins on the unit so that threaded ends 62, 64 of the clamps 60 hang downward below the lower surface 12 of the unit 10. The main brackets 30 are positioned so that the threaded ends 62, 64 of the U-bar clamps pass into the through-holes 33, 35 of the brackets 30 so that the horizontal planar surface 31 of the brackets abuts against the bottom surface portions 12 of the unit. Next, the cylinder portions 43, 45 of the retainer clip 40 are slid over the threaded ends 62, 64 of the clamps 60 so that the triangle portions 42, 44, and 48, 46 are oriented upward between the channel forming sides 34, 36 of the main brackets 30. Finally, the wing nuts 50 rotated onto the threaded ends 62, 64 of the U-bar clamps 60 and tightened down until the retainer clip 40 and main bracket 30 are fixably attached to the undersurface 12 of the unit 10.

Referring to FIGS. 5, 5A, 8A-8C, 9, 11, 12, 14, and 15, 17, 18 the protruding ends 22 of the wheel holders 20 can be slid in the direction of arrow S1 so that wedge shaped tip 24 on the protruding end 22 wedges against angled edge 42 on retainer clip 40 until the slot 23 on the protruding end 22 passes over the vertical wall portion 44 and catches the wheel holder 20 to the main bracket 30. This action can slightly bend the triangle portion 42, 44 causing a snap action when the slot passes over the vertical wall portion 44. The wheel holders 20 can equally attach to opposite triangle end portions 48, 46 in a similar manner.

To disassemble, a user can physically push upward on flat apex portion 42F of each triangle portion 42, 44 on the retainer clip 40 and slide the wheel holders out in a direction opposite to that of arrow S1. Similarly, wheel holders 20 can be removed from opposite triangle end portions 48, 46 in a similar manner. The remaining components (main brackets 30, retainer clips 40 and U-bar clamps 60 can be removed following directions opposite to the assembly directions previously described.

Second Embodiment

Figure 33:
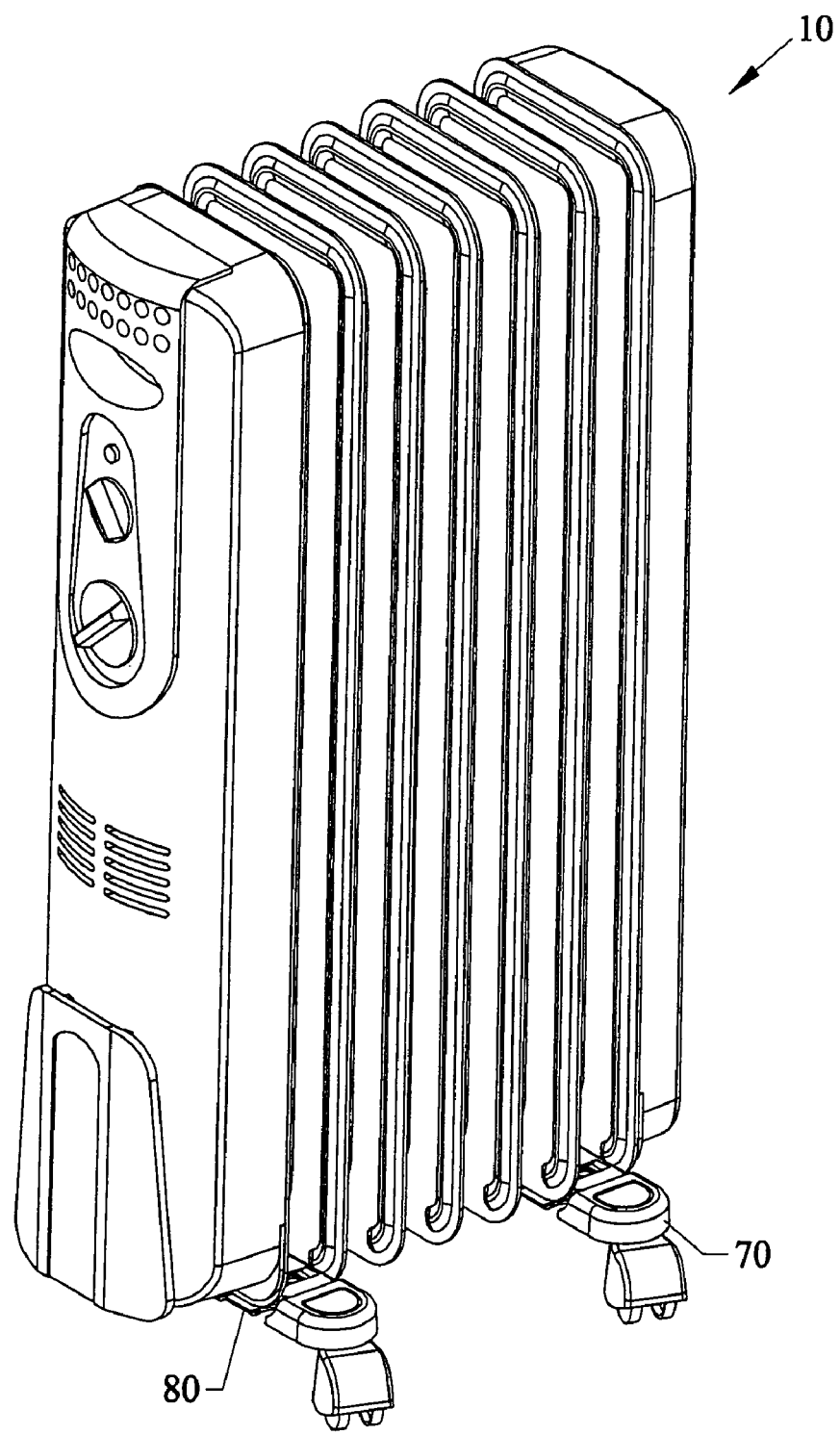
FIG. 33 is a front end and right side perspective view of an environmental control unit such as a portable radiator, with snapable wheels of a second embodiment.
Figure 34:
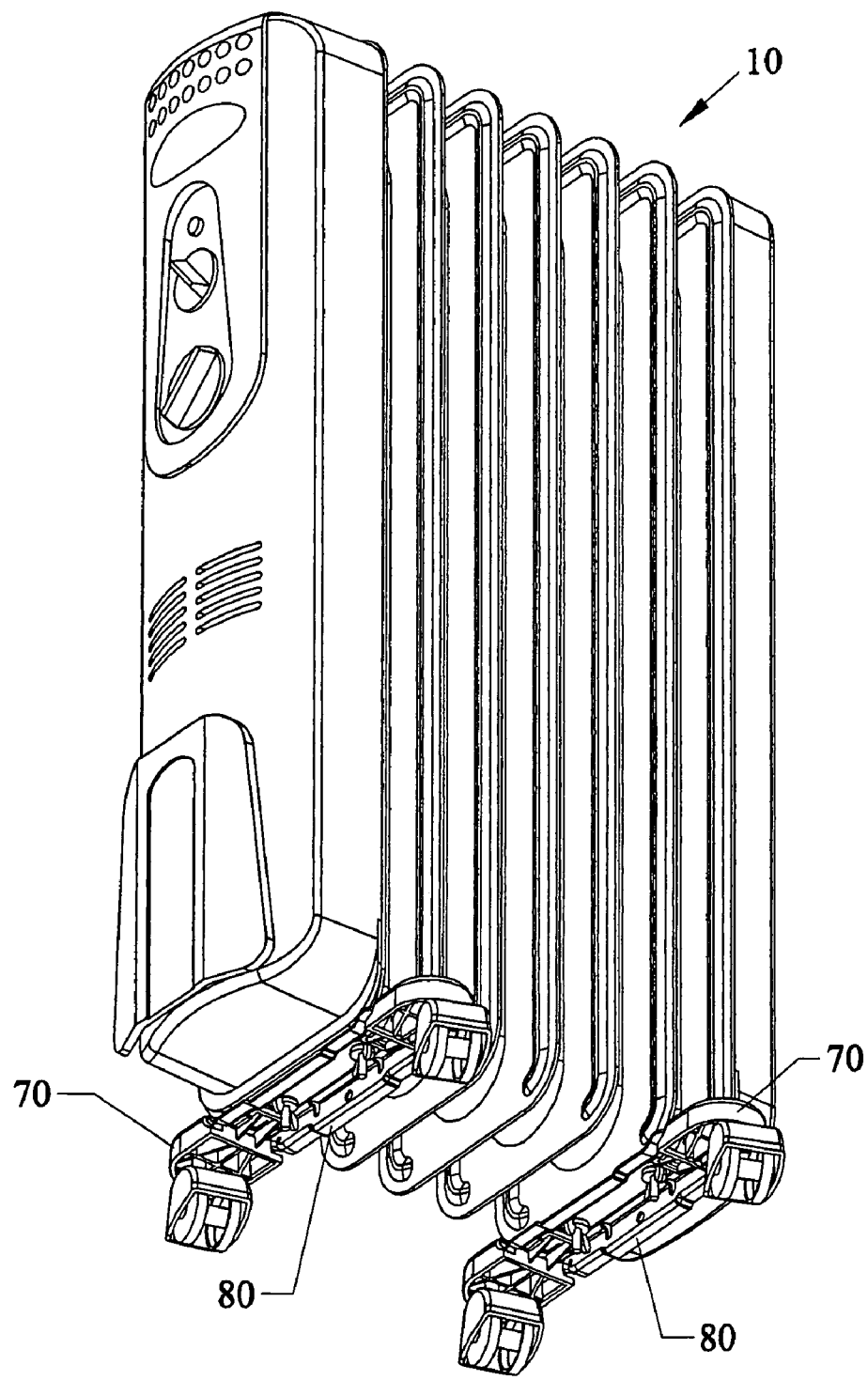
FIG. 34 is a bottom perspective view of FIG. 33.
Figure 36:
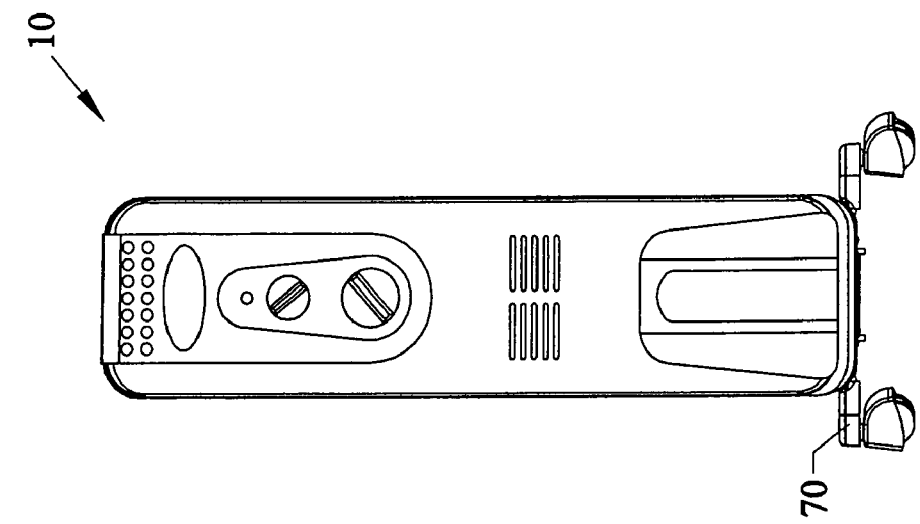
FIG. 36 is a front end view of FIG. 33.
Figure 35:
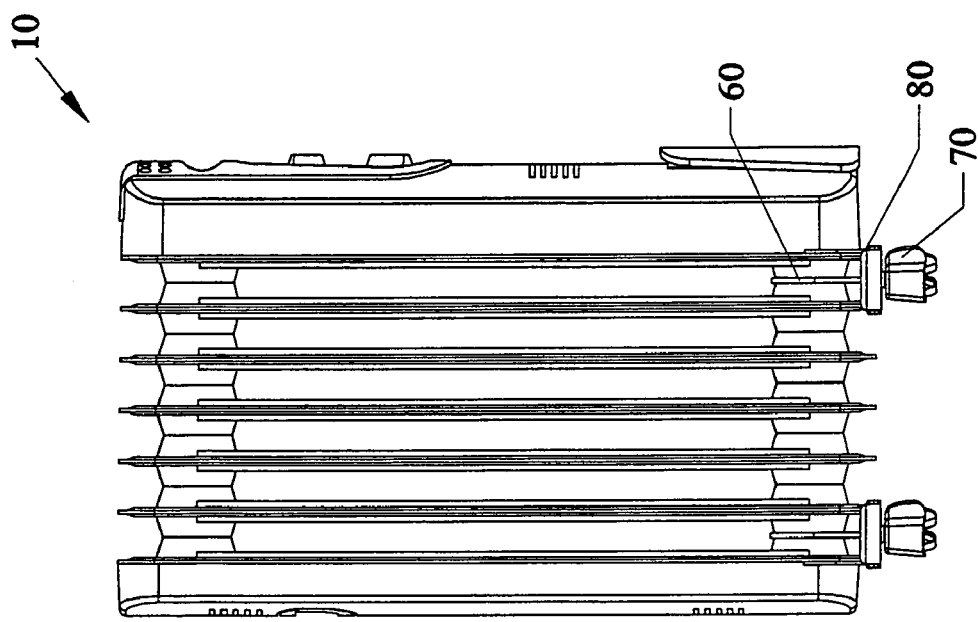
FIG. 35 is a side view of FIG. 33.

FIG. 33 is a front end and right side perspective view of an environmental control unit 10 such as a portable radiator, with snapable wheel holders 70 of a second embodiment that attaches to the second embodiment main bracket 80. FIG. 34 is a bottom perspective view of FIG. 33 showing the second embodiment main bracket 80 and snapable wheel holders 70. FIG. 35 is a side view of FIG. 33 showing the U-bar clamp 60 attached to main bracket 80 and wheel holder 70. FIG. 36 is a front end view of FIG. 33.

FIG. 37 is another view of FIG. 33 with snapable wheel holder 70 removed from the unit 10. FIG. 37A is an enlarged view of one snapable wheel holder 70 of FIG. 37 separated from the unit 10. The wheel holder 70 includes a main horizontal support member 71 with a male end 72 protruding in a horizontal direction therefrom having a rearwardly facing tab (triangular side shape) with sloping upward top surface 73 with an outer end forming a vertical wall type catch 76. Similar to the first embodiment, male protruding end 72 can slide in the direction of arrow S1 and in this embodiment can lock onto the second embodiment main bracket which is shown and described in relation to FIGS. 40A-40C, 42, 43-55. A pivotable fastener 75 such as but not limited to a bolt with plural nuts and washers, can attach the main horizontal support member 71 to the wheel/caster shield cover 77 so that the shield cover 77 can pivot relative to the support member 71. The shield cover can rotatably support wheel(s)/caster(s) 78 inside that allow the unit 10 to roll over various floor surfaces.

Figure 39:
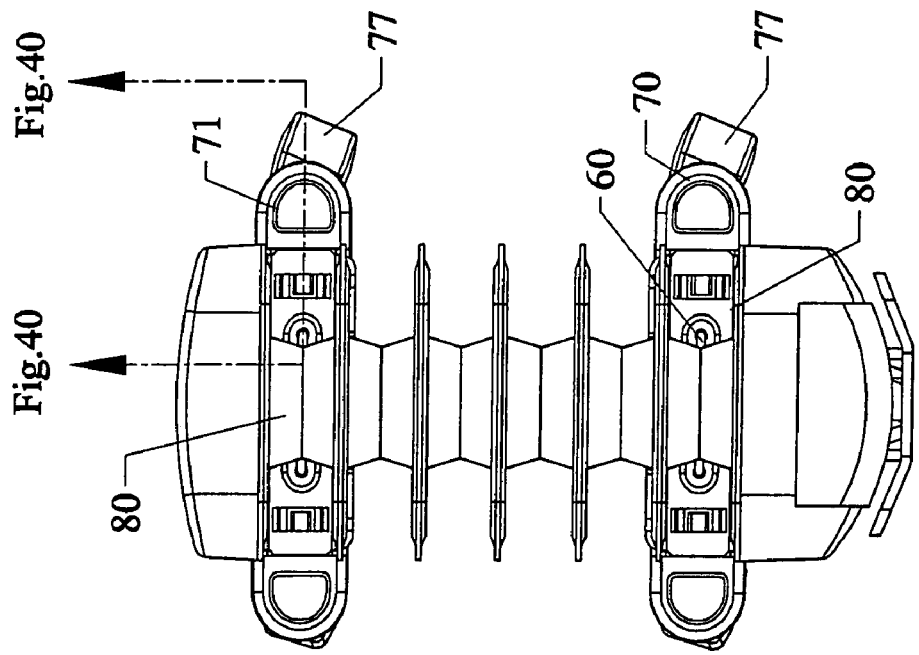
FIG. 39 is a top view of the second embodiment of FIG. 38.
Figure 38:
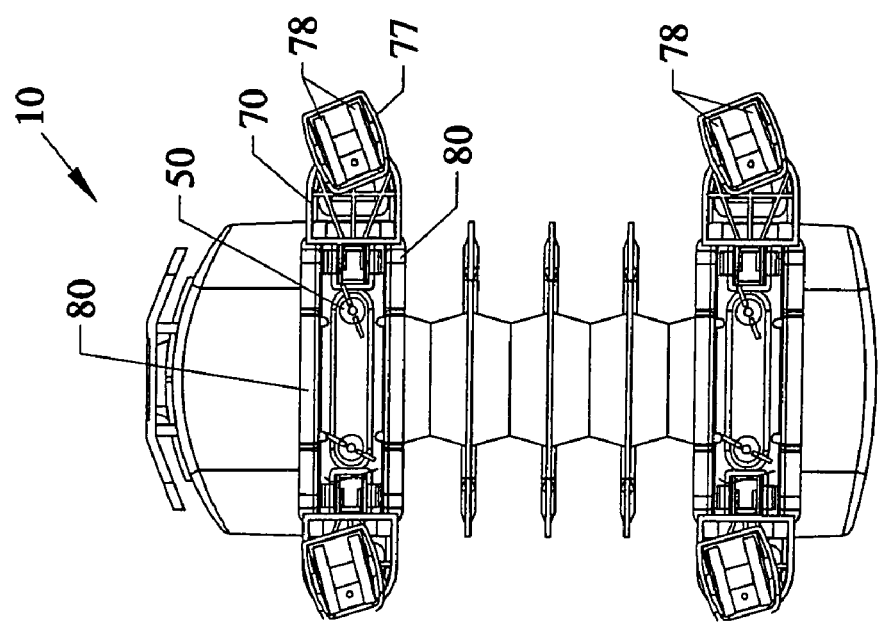
FIG. 38 is a bottom view of the second embodiment with wheels tilted relative to the unit.

FIG. 38 is a bottom view of the second embodiment with wheels 78 tilted relative to the unit 10. FIG. 39 is a top view of the second embodiment of FIG. 38 showing how the attached snappable wheel holder(s) 70 while attached to main brackets 80 extend out perpendicular to both sides of unit 10. In a preferred embodiment, two main brackets 80 can be attached beneath the unit 10, and a total of four snapable wheel holders 70 can attach to the brackets 80 to rollably support the unit 10 over a floor surface.

FIG. 40A is a partial cross-sectional view of a single snapable wheel holder 70 with protruding end 72 of FIG. 39 spaced apart from the unit 10, and to be moved in the direction of arrow S1 into the slot end 82 of the main bracket 80, the latter of which will be described in greater detail in reference to FIGS. 42-48 and 56-59. FIG. 40B is another view of FIG. 40A showing the protruding end of the wheel holder 70 starting to be inserted into a socket 82 of the main bracket 80 underneath the unit 10. In FIG. 40B, the upwardly sloping top surface of the tab 73 causes the tab to be pushed down as the protruding end 72 is being inserted into the slot 82 of the main bracket 80. FIG. 40C is another view of FIG. 40A showing the protruding end 72 of the wheel holder 70 snappably attached within the socket end 82 of the main bracket 80 on the unit 10, where the vertical wall portion 76 is caught to lock within an opening 89 in the horizontal planar portion 81 of the bracket 80. As shown the retainer clip 40 used in the first embodiment is not needed here.

Figure 41:
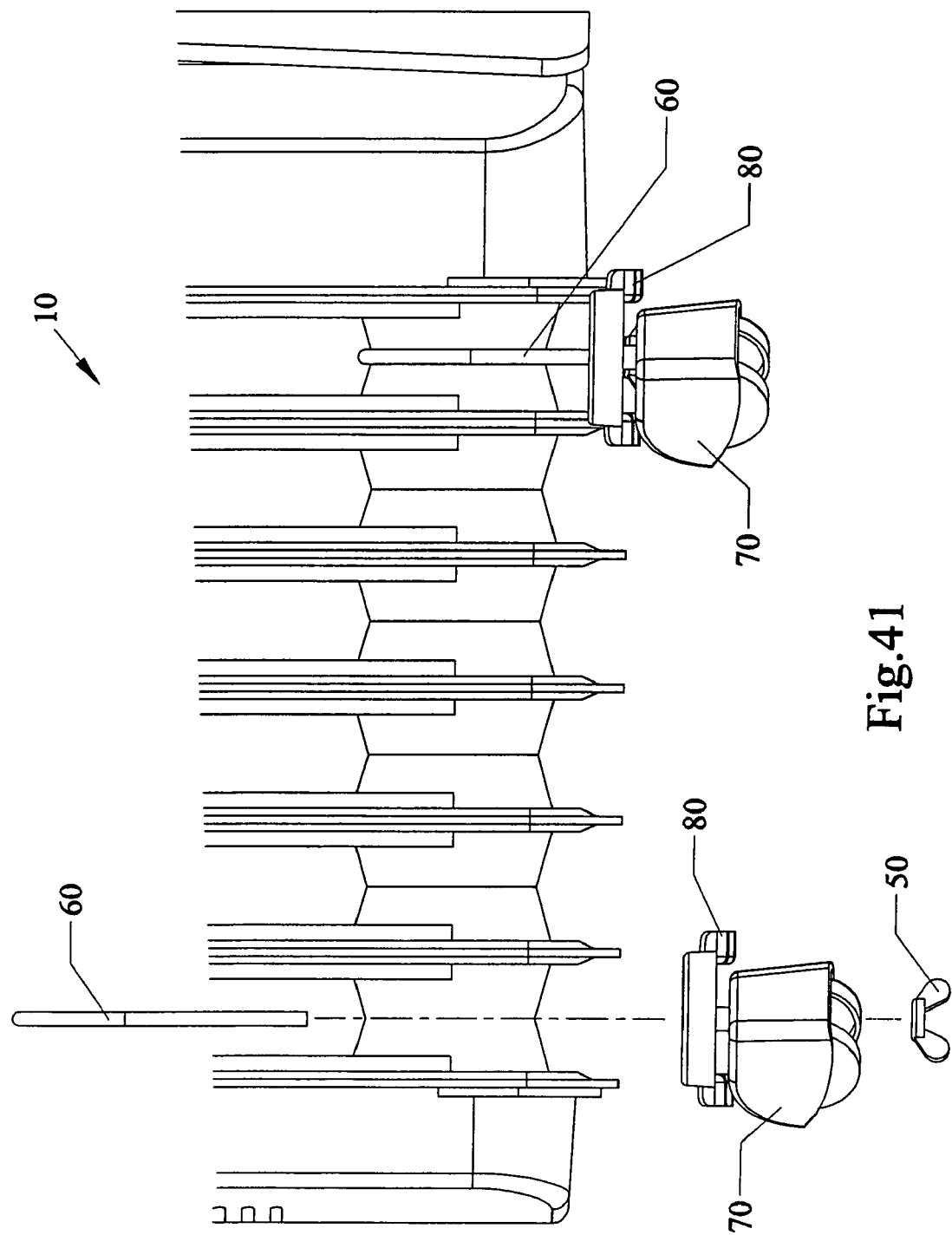
FIG. 41 is an enlarged side view of FIG. 35 showing a single wheel attached on the unit.

FIG. 41 is an enlarged side view of FIG. 35 showing a single wheel holder 70 attached to the main bracket 80 on the unit 10 and another wheel holder 70 unattached from the unit 10.

Figure 42:
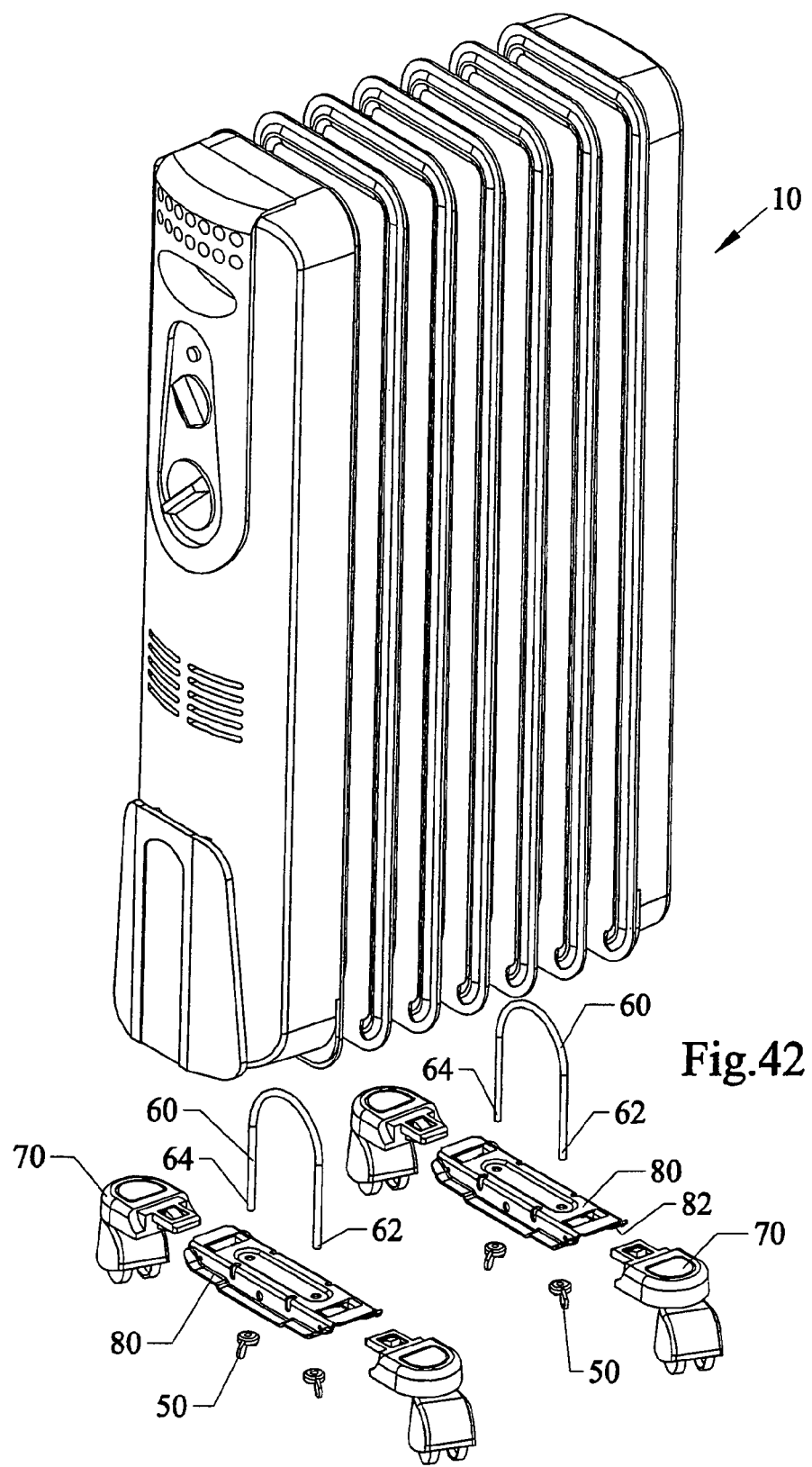
FIG. 42 is an exploded perspective view of FIG. 33 of the snapable wheels and brackets.

FIG. 42 is an exploded perspective view of FIG. 33 of the snapable wheel holders 70 and brackets 80 and U-bar clamps 60 (each with threaded ends 62, 64), wing nuts 50.

FIG. 43 is an upper enlarged view of the main bracket 80 with attached U-bar clamp 60 attached to snapable wheel holders 70. FIG. 44 is another view of FIG. 43 with snapable wheel holders 70 separated from the main bracket 80. FIG. 45 is an exploded view of the components of FIGS. 43-44 separated from one another.

Figure 48:
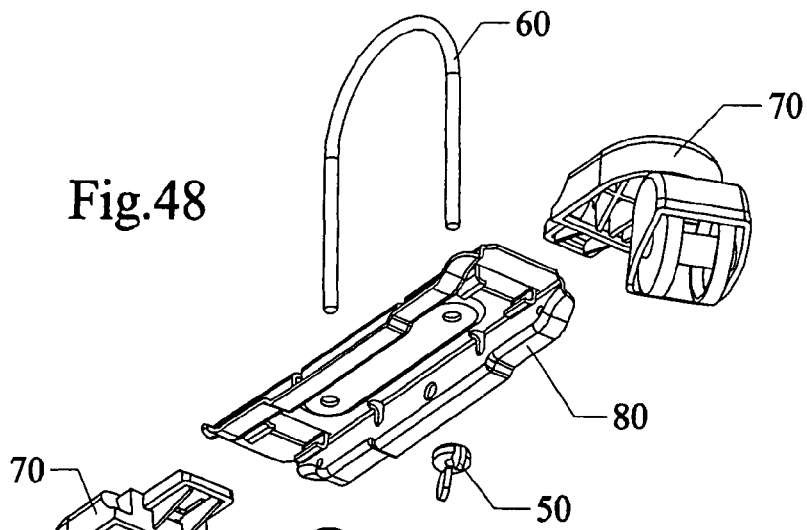
FIG. 48 is a lower view of the exploded view of components of FIG. 45.
Figure 47:
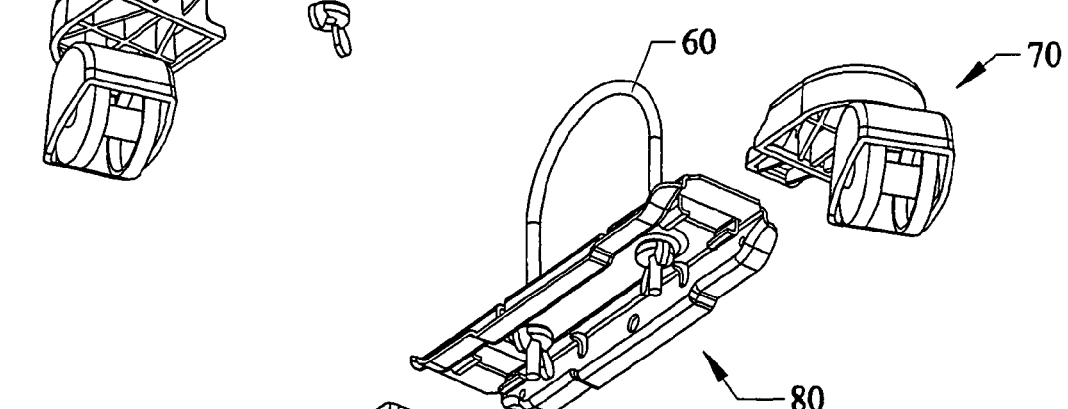
FIG. 47 is a lower view of the snapable wheels separated from bracket of FIG. 44.
Figure 46:
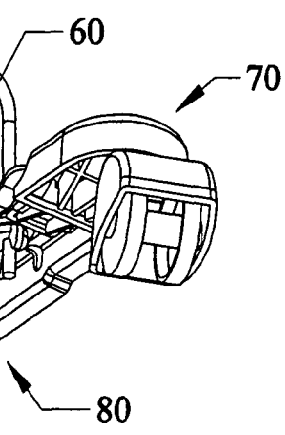
FIG. 46 is a lower view of the assembled bracket with attached wheels of FIG. 43.

FIG. 46 is a lower view of the main bracket 80 with attached U-bar clamp 60 attached to snapable wheel holders 70 of FIG. 43. FIG. 47 is a lower view of the snapable wheel holders 70 separated from the main bracket 80 of FIG. 44. FIG. 48 is a lower exploded view of the components of FIG. 45.

Figure 53:
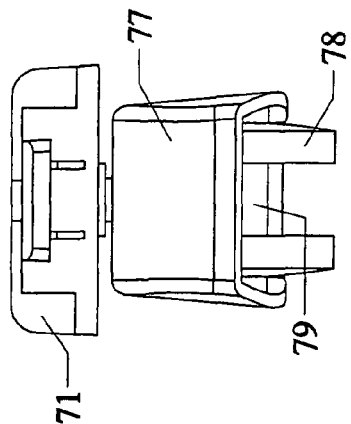
FIG. 53 is rear view of the snapable wheel holder and wheel of FIGS. 51-52.
Figure 55:
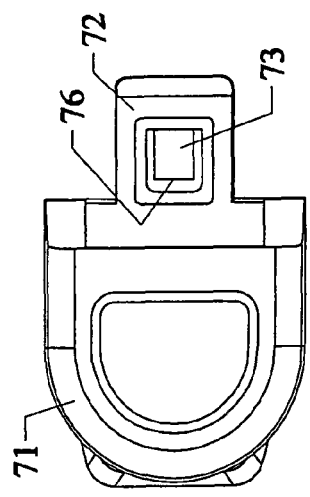
FIG. 55 is a top view of the snapable wheel holder and wheel of FIGS. 51-54.
Figure 52:
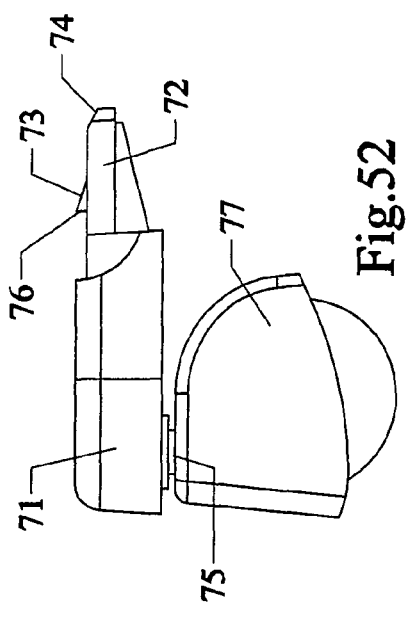
FIG. 52 is a side view of the snapable wheel holder and wheel of FIG. 51.
Figure 54:
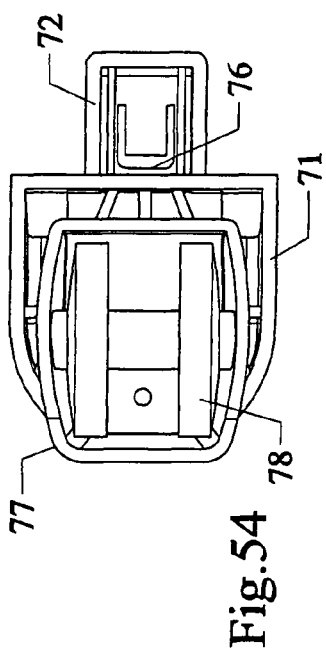
FIG. 54 is a bottom view of the snapable wheel holder and wheel of FIGS. 51-53.
Figure 51:
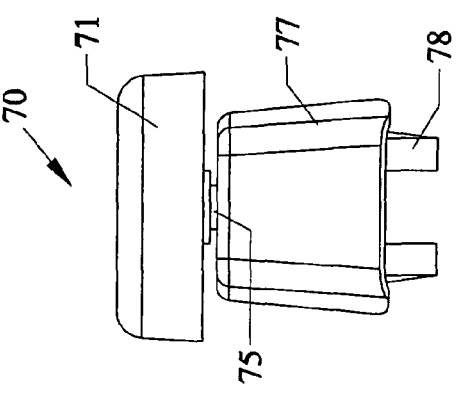
FIG. 51 is a front view of the snapable wheel holder and wheel of FIGS. 49-50.

FIG. 49 is a top perspective view of a single snapable wheel holder 70 and wheel(s) 78. FIG. 50 is bottom perspective view of the snapable wheel holder 70 and wheel(s) 78 of FIG. 49. FIG. 51 is a front view of the snapable wheel holder 70 and wheel(s) 78 of FIGS. 49-50. FIG. 52 is a side view of the snapable wheel holder 70 and wheel(s) 78 of FIG. 51. FIG. 53 is rear view of the snapable wheel holder 70 and wheel(s) 78 of FIGS. 51-52. FIG. 54 is a bottom view of the snapable wheel holder 70 and wheel(s) 78 of FIGS. 51-53. FIG. 55 is a top view of the snapable wheel holder 70 and wheel(s) 78 of FIGS. 51-54.

Referring to FIGS. 49-55, a single wheel holder 70 can have a main horizontal support member 71 with a male end 72 protruding in a horizontal direction therefrom having a rearwardly facing tab (triangular side shape) with sloping upward top surface 73 with an outer end forming a vertical wall type catch 76. Similar to the first embodiment, male protruding end 72 can slide in the direction of arrow S1 and in this embodiment can lock onto the second embodiment main bracket which is shown and described in relation to FIGS. 40A-40C, 42, 43-55. A pivotable fastener 75 such as but not limited to a bolt with plural nuts and washers, can attach the main horizontal support member 71 to the wheel/caster shield cover 77 so that the shield cover 77 can pivot relative to the support member 71.

The shield cover can rotatably support wheel(s)/caster(s) 78 inside that allow the unit 10 to roll over various floor surfaces. A preferred embodiment can have a pair of disc type wheels 78 attached to one another by an axle 79, that can snap into a standard clip (not shown) inside of the shield cover 77. Alternatively, a caster type wheel such as a ball can be rotatably supported underneath the shield cover 77.

The horizontal support member 71 with a male end 72 protruding therefrom and tab 73, 76 can be formed from premolded plastic, and the like, and the shield cover 77 and wheel(s)/caster(s) 78 can be formed from plastic. Alternatively, these pieces can all be formed from metal. Still furthermore, these pieces can be formed from any combination of plastic and metal, and the like.

Figure 56:
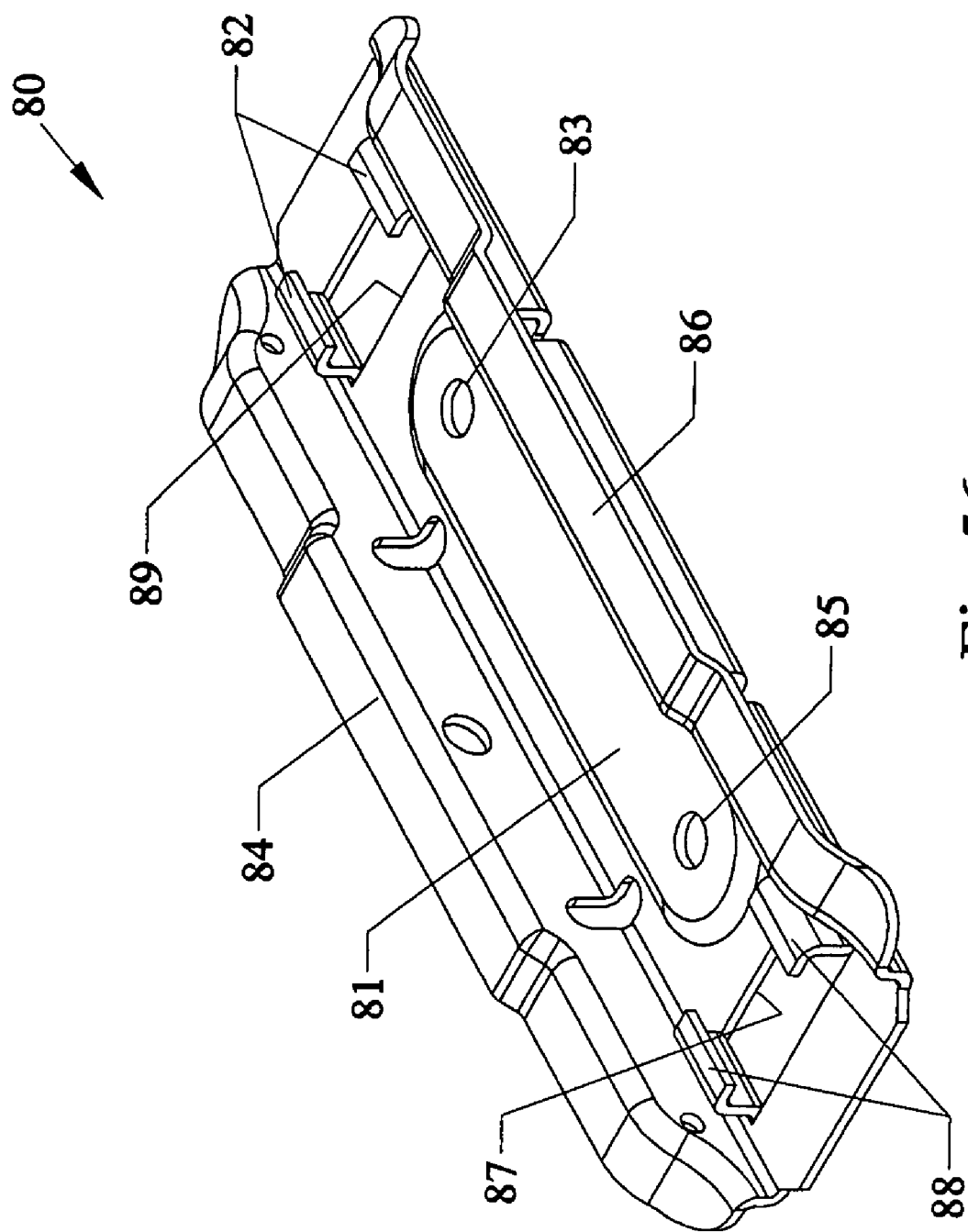
FIG. 56 is a top perspective view of the main bracket used for attaching the wheels thereto of the preceding figures for the second embodiment.

FIG. 56 is a top perspective view of the main bracket 80 used for attaching the wheel holders 70 thereto of the preceding figures for the second embodiment. FIG. 57 is a top view of the main bracket 80 of FIG. 56. FIG. 58 is an end view of the main bracket 80 of FIGS. 56-57. FIG. 59 is a side view of the main bracket 80 of FIGS. 56-58.

Referring to FIGS. 56-59, main bracket 80 can have a horizontal planar portion 81, a first end 82 having a pair of bent L-shaped portions facing one another extending below one end of the bracket 80. On an opposite second end 88 of the bracket 80 can be another pair of bent L-shaped portions facing one another extending below the bracket 80 as well. Each pair 82 and 88 of bent L-shaped portions forms a slot for receiving the protruding end 72 of the wheel holders 20 that were previously described. The cut-out formed in the planar surface 81 by the bent L-shaped portions, form openings for catching the vertical wall 76 of the bendable tab 73.

Two through-holes 83, 85 pass through mid-portions of the horizontal planar portion 81 of the bracket 80 and can be used for attaching the bracket 80 to the U-bar clamp 60. The sides 84, 86 of the main bracket 80 can be bent so that the sockets 82, 88 formed by the pairs of bent L-shaped portions 82, 88 are located within channels below the depth formed by the sides 84, 86.

An assembly of the components will now be described. Initially an assembler can take two main brackets 80 and attach each underneath the radiator unit 10 by the U-bar clamps 60. Referring to FIGS. 34, 35, 38, 39, 40A-40C, 41, 42, 45, 48, 56-59 the U-bar clamps 60 can be hung from the lower horizontal support member 14 of the radiator in locations between the heat exchanger fins on the unit so that threaded ends 62, 64 of the clamps 60 hang downward below the lower surface 12 of the unit 10. The main brackets 80 are positioned so that the threaded ends 62, 64 of the U-bar clamps pass into the through-holes 83, 85 of the brackets 30 so that the horizontal planar surface 31 of the brackets abuts against the bottom surface portions 12 of the unit. Finally, the wing nuts 50 rotated onto the threaded ends 62, 64 of the U-bar clamps 60 and tightened down until the main bracket 80 is fixably attached to the undersurface 12 of the unit 10.

Referring to FIGS. 37, 37A, 40A-40C, 41, 43-48, 49-55, the protruding ends 72 of the wheel holders 70 can be slid in the direction of arrow S1 so that wedge shaped tip 74 on the protruding end 72 wedges into slot 82. As the protruding end 72 of the wheel holder 70 slides into slot 82 of the bracket 80, the sloping upward top surface 73 of the tab causes the tab to bend down, and then snap upward into catch opening 89 in planar portion 81 of the bracket 80. The wheel holders 80 can equally attach to opposite end slots 88 of the bracket 80 in a similar manner.

To disassemble, a user can physically push upward on the tab portion 73 on the wheel holder 70, and then the wheel holder can be slid out in a direction opposite to that of arrow S1. The remaining components (main brackets 30, retainer clips 40 and U-bar clamps 60 can be removed following directions opposite to the assembly directions previously described.

While some pieces of the invention have been described as being made of plastic, and metal, the invention can be used with all plastic, all metal and different combinations thereof, and different types of materials as well.

Although the invention describes a separate bracket attached beneath the environmental control unit, the bracket can be pre-formed or molded into the unit itself. For example, attachment portions can be pre-molded or preformed underneath the environmental control unit, or are built into lower side edges of the environmental control unit as needed.

While the invention describes having a protruding end on the wheel holders, the bracket can have protruding members which mateable and snapably attach to slots on the wheel holders. Thus, the invention can be practiced by having snapable members and slots on opposite components to those described in reference to the drawings.

Although the drawings show the invention for use with a radiator, the invention can be used under other types of heaters, and also under other types of fans, and the like. Additionally, the invention can be used under cabinets, boxes, and the like, that have similar needs to be mobile, turned, and have the wheels be small and removable, and easily attachable when needed.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A mobile support apparatus for an environmental control unit comprising:
    an environmental control unit selected from one of a heater, a radiator and a fan;
    a bracket having an upper surface, a first end and a second end opposite the first end, and a first side between the first end and the second end, and a second side between the first end and the second end, the upper surface of the bracket attached under the environmental control unit, the bracket having a first horizontal oriented rectangular slot into the first end and a second horizontal oriented rectangular slot into the second end of the bracket which is opposite to the first end of the bracket;
    a first wheel rotatably attached to a first wheel holder, the first wheel holder having a first horizontal protruding rectangular end on top of the first wheel extending sideways therefrom;
    a first snapable triangular tab and a first horizontal snapable slot that connect with one another, wherein the first wheel holder has either the first snapable triangular tab or the first horizontal snapable slot, and wherein the first end of the bracket has either the first horizontal snapable slot or the first snapable triangular tab;
    a second wheel rotatably attached to a second wheel holder, the second wheel holder having a second horizontal protruding rectangular end on top of the second wheel extending sideways therefrom;
    a second snapable triangular tab and a second horizontal snapable slot that connect with one another, wherein the second wheel holder has either the second snapable triangular tab or the second horizontal snapable slot, and wherein the second end of the bracket has either the second horizontal snapable slot or the second snapable triangular tab,
    wherein the first horizontal protruding rectangular end of the first wheel holder is inserted horizontally into the first horizontal oriented rectangular slot on the first end of the bracket and is locked together by the first triangular tab snapably attaching into the first horizontal snapable slot, and the second horizontal protruding rectangular end of the second wheel holder is inserted horizontally into the second horizontal oriented rectangular slot of the bracket and is locked together by the second triangular tab snapably attaching into the second horizontal snapable slot, so that the environmental control unit is rollable on a floor surface by the first wheel and the second wheel, and the first and second wheel holders are removable from the bracket.

2. The mobile support apparatus of claim 1, wherein the first snapable triangular tab and the second snapable triangular tab are each members that protrude upward from the first protruding end and the second protruding end, respectively.

3. The mobile support apparatus of claim 2, further comprising:
    a first horizontal edge adjacent the first vertical slot on the bracket for catching the first snapable triangular tab of the first protruding end; and a second horizontal edge adjacent the second vertical slot on the bracket for catching the second snapable triangular tab of the second protruding end.

4. The mobile support apparatus of claim 1, wherein the first wheel and the second wheel each include:
a pair of wheels with an axle therebetween, the axle being attached to each wheel holder so that the pair of wheels rotates relative to each wheel holder.

5. The mobile support apparatus of claim 1, further comprising:
U-shaped clamp with threaded fasteners for mounting the bracket underneath the environmental control unit.

6. The mobile apparatus of claim 1, further comprising:
a second bracket attached to under the environmental control unit spaced parallel to the first bracket, the second bracket having a first horizontal oriented rectangular slot into one end and a second horizontal oriented rectangular slot into a second end opposite to the first end;
a third wheel rotatably attached to a third wheel holder, the third wheel holder having a third horizontal protruding rectangular end on top of the third wheel extending sideways therefrom;
a third snapable triangular tab and a third horizontal snapable slot;
a fourth wheel rotatably attached to a fourth wheel holder, the fourth wheel holder having a fourth horizontal protruding rectangular end on top of the fourth wheel extending sideways therefrom;
a fourth snapable triangular tab and a fourth horizontal snapable slot, wherein the first horizontal protruding rectangular end of the third wheel holder is inserted into the first horizontal oriented rectangular slot on the one end of the second bracket and are attached together by the third triangular tab snapably inserting into the third horizontal snapable slot, and the fourth horizontal protruding rectangular end of the fourth wheel holder is inserted into the fourth horizontal oriented rectangular slot of the second bracket and are attached together by the fourth triangular tab snapably inserting into the fourth horizontal snapably slot, so that the environmental control unit is rollable on a floor surface by the first wheel and the second wheel and the third wheel and the fourth wheel, and the first and second wheel holders are removable from the first bracket, and the third and fourth wheel holders are removeable from the second bracket.

7. A mobile support for an environmental control units comprising:
an environmental control unit selected from one of a heater, a radiator and a fan;
a first main bracket having an upper surface and a first end and a second end opposite the first end, and a first side and a second side each between the first end and the second end, the upper surface of the bracket being attached underneath the control unit, the first main bracket having a first horizontal facing slot into the first end of the first main bracket, and a second horizontal facing slot into the second end of the first main bracket opposite to the one end;
a first wheel;
a first horizontal protruding member extending sideways from the first wheel;
a first snapable triangular tab and first horizontal snapable slot, wherein the first horizontal protruding member has either the first snapable triangular tab or the first horizontal snapable slot, and wherein the first end of the bracket has either the first horizontal snapable slot or the first snapable triangular tab, the first horizontal protruding member inserts in a first horizontal direction into the first horizontal socket on the one end of the first main bracket for attaching the first wheel to the environmental control unit by the first triangular tab snapably attaching into the first horizontal snapable slot;
a second wheel; and
a second horizontal protruding member extending sideways from the second wheel;
a second snapable triangular tab and a second horizontal snapable slot, wherein the second horizontal protruding member has either the second snapable triangular tab or the second horizontal snapable slot, and wherein the second end of the bracket has either the second horizontal snapable slot or the second snapable triangular tab, the second horizontal protruding member inserts in a second horizontal direction opposite the first horizontal direction into the second horizontal socket on the second end of the first main bracket for attaching the second wheel to the environmental control unit by the second triangular tab snapably attaching into the second horizontal snapable slot, so that the environmental control unit is rollable on a floor surface by the first wheel and the second wheel.

8. The mobile support of claim 7, wherein the first protruding member and the second protruding member are respectively pre-connected to the first wheel and the second wheel, and the first socket and second socket are respectively pre-connected to the environmental control unit.

9. The mobile support of claim 7, wherein the first snapable triangular tab is located on the first protruding member, and the first horizontal snapable slot is located on the first horizontal slot, and the second snapable triangular tab is located on the second protruding member, and the second horizontal snapable slot is located on the second horizontal slot.

10. The mobile support of claim 7, wherein the first snapable triangular tab is located on the first horizontal rectangular slot, and the first horizontal slot is located on the first protruding member, and the second snapable triangular tab is located on the second horizontal rectangular slot, and the second horizontal slot is located on the second protruding member.

11. The mobile support of claim 7, further comprising:
a second main bracket attached underneath the control unit and spaced parallel from the first main bracket, the second main bracket having a third horizontal slot into one end of the second main bracket, and a fourth horizontal slot into a second end of the second main bracket opposite to the one end;
a third wheel;
a third horizontal protruding member extending sideways from the third wheel;
a third snapable triangular tab and third horizontal snapable slot, the third horizontal protruding member inserts into the third horizontal socket on the one end of the second main bracket for attaching the third wheel to the environmental control unit by the third triangular tab snapably attaching into the third horizontal snapable slot;
a fourth wheel; and
a fourth horizontal protruding member extending sideways from the fourth wheel;
a fourth snapable triangular tab and a fourth horizontal snapable slot, the fourth horizontal protruding member inserts into the fourth horizontal socket on the second end of the second main bracket for attaching the fourth wheel to the environmental control unit by the fourth triangular tab snapably attaching into the fourth horizontal snapable slot, so that the environmental control unit is rollable on a floor surface by the first wheel and the second wheel, and the third wheel and the fourth wheel.

12. A method of attaching and detaching wheels from a bracket that is attached to an environmental control unit, comprising the steps of:

providing an environmental control unit selected from one of a heater, a radiator and a fan;

providing a first main bracket having a first horizontal rectangular slot into one end of the first main bracket, and a second horizontal rectangular slot into a second end of the first main bracket, the second end being opposite the first end;

attaching the first main bracket underneath the environmental control unit;

providing a first wheel with a first horizontal rectangular protruding end on top of the first wheel, the first horizontal rectangular protruding end extending sideways from the first wheel;

providing a second wheel with a second horizontal rectangular protruding end on top of the second wheel, the second horizontal rectangular protruding end extending sideways from the second wheel;

attaching the first wheel to the environmental control unit by inserting a first horizontal rectangular protruding member in a first horizontal direction into a first horizontal rectangular socket, and locking the first wheel to the first protruding member by snapping a first snapable triangular tab into a first horizontal snapable slot;

attaching the second wheel to the environmental control unit by inserting a second horizontal rectangular protruding member in a second horizontal direction opposite to the first horizontal direction, into a second horizontal rectangular socket, and locking the second wheel to the second protruding member by snapping a second snapable triangular tab into a second horizontal snapable slot; and rolling the environmental control unit on a floor surface by the first wheel and the second wheel.

* * * * *